United States Patent
Anderson et al.

(10) Patent No.: US 10,751,878 B2
(45) Date of Patent: Aug. 25, 2020

(54) METHODS AND SYSTEMS FOR BILLING ROBOT USE

(71) Applicant: A&K Robotics Inc., Vancouver (CA)

(72) Inventors: Matthew Henry Anderson, Vancouver (CA); Jessica Hil-Yin Yip, Burnaby (CA); Anson Yan Shun Kung, Richmond (CA); Ranjit Singh Khangura, Surrey (CA)

(73) Assignee: A&K Robotics Inc., Vancouver (CA)

( * ) Notice: Subject to any disclaimer, the term of this patent is extended or adjusted under 35 U.S.C. 154(b) by 119 days.

(21) Appl. No.: 15/836,742

(22) Filed: Dec. 8, 2017

(65) Prior Publication Data

US 2018/0161980 A1 Jun. 14, 2018

Related U.S. Application Data

(60) Provisional application No. 62/431,797, filed on Dec. 8, 2016.

(51) Int. Cl.
*G06Q 40/00* (2012.01)
*B25J 9/16* (2006.01)
(Continued)

(52) U.S. Cl.
CPC ............. *B25J 9/1669* (2013.01); *B25J 9/161* (2013.01); *B25J 9/1694* (2013.01); *B25J 11/0085* (2013.01); *G06F 9/06* (2013.01); *G06Q 20/085* (2013.01); *G06Q 20/14* (2013.01); *G06Q 30/04* (2013.01); *G06Q 40/00* (2013.01); *G06Q 40/12* (2013.12); *Y10S 901/01* (2013.01); *Y10S 901/46* (2013.01)

(58) Field of Classification Search
None
See application file for complete search history.

(56) References Cited

U.S. PATENT DOCUMENTS

| 7,949,616 B2 | 5/2011 | Levy et al. |
| 8,849,680 B2 | 9/2014 | Wright et al. |

(Continued)

FOREIGN PATENT DOCUMENTS

| CN | 107169750 | 9/2017 |
| CN | 107195112 | 9/2017 |
| CN | 107220835 | 9/2017 |

*Primary Examiner* — Paul Danneman
(74) *Attorney, Agent, or Firm* — Todd A. Rattray; Oyen Wiggs Green & Mutala LLP

(57) ABSTRACT

Methods and systems for billing the use of a robot, including methods and systems for reducing a robot's functionality based on a user's account information. In some embodiments, the system comprises a computer readable memory comprising a database with a user's account information, a processor operably coupled to the computer readable memory and to a robot, a checking application stored on the computer readable memory and executable by the processor for determining if the user's account is active based on the account data and a functionality reducing application stored on the computer readable memory executable by the processor for reducing the robot's functionality to a reduced state if the checking application determines the user's account is not active and limiting the robot's functionality to the reduced state until the checking application determines that the user's account is active.

31 Claims, 9 Drawing Sheets

(51) Int. Cl.
  *G06F 9/06*   (2006.01)
  *B25J 11/00*  (2006.01)
  *G06Q 20/08*  (2012.01)
  *G06Q 20/14*  (2012.01)
  *G06Q 30/04*  (2012.01)

(56) References Cited

U.S. PATENT DOCUMENTS

| | | |
|---|---|---|
| 9,440,351 B2 | 9/2016 | Bostick et al. |
| 9,446,511 B2 | 9/2016 | Kuffner, Jr. et al. |
| 9,662,784 B2 | 5/2017 | Bostick et al. |
| 10,410,007 B2 * | 9/2019 | Erhart .................... G06F 21/56 |
| 2002/0177925 A1 | 11/2002 | Onishi et al. |
| 2003/0236723 A1 | 12/2003 | Angott |
| 2006/0287783 A1 | 12/2006 | Walker |
| 2011/0178619 A1 * | 7/2011 | Jung ................. G05B 19/0426 |
| | | 700/95 |
| 2013/0290234 A1 | 10/2013 | Harris et al. |
| 2014/0279430 A1 | 9/2014 | Holman et al. |
| 2014/0283133 A1 * | 9/2014 | Rodriguez ............ G06F 21/121 |
| | | 726/29 |
| 2015/0100461 A1 | 4/2015 | Baryakar et al. |
| 2017/0129602 A1 | 5/2017 | Alduaiji et al. |

\* cited by examiner

METHODS AND SYSTEMS FOR BILLING ROBOT USE

CROSS-REFERENCE TO RELATED APPLICATIONS

This application claims priority from application No. 62/431,797, filed 8 Dec. 2016. For purposes of the United States, this application claims the benefit under 35 U.S.C. § 119 of application No. 62/431,797, filed 8 Dec. 2016, and entitled METHODS AND SYSTEMS FOR BILLING ROBOT USE which is hereby incorporated herein by reference for all purposes.

TECHNICAL FIELD

The present disclosure relates to robots, and in particular, to tracking and billing robot use.

BACKGROUND

Automated systems, such as robots, have been widely used in a range of industries, such as automobile manufacturing, for many years. More recently, robotic systems have begun to be used in the cleaning industry. Proposals have been made to automate machines such as scrubbers and vacuum cleaners for autonomous use. Autonomous use of cleaning machines provides cost savings over human operated machines and greater predictability in the amount of time and materials spent. Autonomous cleaning machines may work for greater durations than human workers. Using autonomous cleaning machines, or robots, also avoids the costs of training new personnel due to high turn-over rates in the cleaning industry.

Multiple robots or fleets of robots may also be used for janitorial work. For example, multiple autoscrubbers may be used to clean a large facility, such as an airport or a hospital. Multiple robots may be managed individually or as a group.

There exists a continuing desire to advance and improve technology related to cleaning robots.

SUMMARY

According to one aspect, there is provide a system for billing a registered user of a robot. The system includes a sensor couplable to the robot for detecting a change in a billable attribute of the robot, a computer readable memory, a processor operably coupled to the computer readable memory and communicatively couplable to the sensor through a communications interface for receiving data based on the change in the billable attribute, and an application stored on the computer readable memory and executable by the processor for calculating a billable amount to bill to a registered user. The billable amount is based on the change in the billable attribute.

The system may also include a bill generating application stored on the computer readable memory for execution by the processor for generating a bill based on the billable amount.

The system may also include a notification application stored on the computer readable memory for execution by the processor for notifying the registered user of the bill.

The computer readable memory may be couplable to the robot and the processor may be couplable to the robot.

The computer readable memory and the processor may be located at an application server and communicate wirelessly through a communications interface with a processor coupled to the robot for receiving data based on changes in the billable attribute.

The sensor may include multiple sensors.

The system may also include a display coupled to the robot for displaying the bill and payment options and an input terminal coupled to the robot for selecting a payment option and for receiving and processing a payment from the registered user.

The billable amount may be calculated based on the change in the billable attribute detected by at least one sensor of the multiple sensors.

The billable amount may be calculated based on the change in the billable attribute detected by each sensor.

A bill may be generated based on the billable amount and, and the registered user of the bill may be notified.

The system may also include a local computer readable memory couplable to the robot, a local processor couplable to the robot and operably couplable to the local computer readable memory and the sensor, and a local communications interface coupled to the robot and operably coupled to the local processor for transmitting data based on the change in the billable attribute of the robot to the application server.

The system may also include a second local computer readable memory couplable to a second robot, a second sensor couplable to the second robot, a second local processor couplable to the second robot and operably couplable to the second local computer readable memory and the second sensor, and a second local communications interface coupled to the second robot and operably coupled to the second local processor for transmitting data based on the change in the billable attribute of the second robot to the robot for transmission from the robot to the application server.

The system may also include an input device couplable to the robot, an application stored on a local computer readable memory couplable to the robot and executable by a local processor operably coupled to the local readable memory, for wirelessly transmitting data based on the billable attribute to an application server upon a send command being input at the input device. The application server may include the computer readable memory and the processor.

The billable attribute may include a runtime of the robot (e.g. the amount of time that the robot has been operational or performing particular tasks, since a suitable trigger, such as a last billing event).

The billable attribute may include an amount of power consumed by the robot.

The billable attribute may also include a distance travelled by the robot.

The billable attribute may also include: a number of saved jobs on the robot, a number of saved paths on the robot, a number of users of the robot, a number of preset zones cleaned by the robot, a volume or weight of debris collected by the robot, a time spent by technical support supporting the robot, a time spent by a remote manager remotely managing the robot, a number of software updates to the robot, and/or a number of notifications from the robot to the user.

The robot may be a janitorial services robot and the billable attribute may also include a volume or weight of water used by the janitorial services robot. The billable attribute may also include an area cleaned by the janitorial services robot, a weight carried by the janitorial services robot, a volume or weight of cleaning solution used by the janitorial services robot, or a volume or weight of trash collected by the janitorial services robot.

The robot may be a portering robot and the billable amount may be an integration of a distance traveled and a weight carried by the portering robot.

The sensor may be a volumetric sensor for sensing a volume of a fluid carried by the robot.

The sensor may be implemented by the processor.

The sensor may be separately embodied from the processor.

The system may also include a local computer readable memory coupled to the robot, a local processor coupled to the robot and operably coupled to the local computer readable memory and an application stored on the local readable memory and executable by the local processor for reducing the robot's functionality if use of the robot is not in compliance with terms of use for the robot.

The terms of use may be stored on the local readable memory and comprise a requirement for sending data based on a change in the billable attribute to the processor.

The system may also include a terms of use application for determining if the use of the robot is in compliance with the terms of use.

According to another aspect, there is provided a system for reducing a robot's functionality based on a user's account information. The system includes a computer readable memory comprising a database with the user's account information, a processor operably coupled to the computer readable memory and to the robot and a checking application stored on the computer readable memory and executable by the processor for determining if the user's account is active based on the account data. The system also includes a functionality reducing application stored on the computer readable memory executable by the processor for reducing the robot's functionality to a reduced state if the checking application determines the user's account is not active and limiting the robot's functionality to the reduced state until the checking application determines that the user's account is active.

The computer readable memory may also include a local memory couplable to the robot and a remote memory at an application server and the processor may include a local processor couplable to the robot and operably coupled to the local memory and a remote processor at the application server operably coupled to the remote memory. The remote processor may be operably coupled to a remote communications interface and the local processor may be operably coupled to a local communications interface for wirelessly communicating with the remote communications interface. The functionality reducing application may be stored on the local memory and executed by the local processor.

The checking application and the database may be stored on a remote memory and the checking application may be executed by a remote processor.

The functionality reducing application may be configured to limit the robot's functionality to a reduced state until the checking application determines that the user's account is active and then, upon determining that the user's account is active, increase the robot's functionality to a prior state, the prior state having increased functionality relative to the reduced state.

The checking application may be configured to determine that a user's account is not active by determining that payment by the user for use of the robot's functionality is in arrears according to a payment acceptability threshold.

The payment acceptability threshold may be based on one or more of: a payment history of the user; an amount of prepaid funds associated with the user's account; an amount of credit accumulated in the user's account; an amount of time between notification of a bill attributed to the user account for use of the robot's functionality and a time that the checking application determines if the user's account is active.

The system may comprise a compliance notification application stored on the computer readable memory and executable by a processor for displaying a default notification to the user, via a user interface at the robot, that the user's account has been determined to be inactive based on the user's payment for the use of the robot's functionality failing to satisfy the payment acceptability threshold, the compliance notification application configured to display the default notification to the user in response to the user attempting to start use of the robot's functionality.

The system may also include a user interface coupled to the robot for displaying account status information and account renewal options.

The system may also include an input device coupled to the robot for receiving and processing a payment from the user to activate the user's account.

Reducing the robot's functionality to a reduced state may include disabling a function performed by the robot.

Reducing the robot's functionality to a reduced state may include disabling the robot's mobility for a set interval of time.

Reducing the robot's functionality to a reduced state may include reducing a speed of travel of the robot.

Disabling a function performed by the robot may include disabling a fluid dispensing system coupled to the robot.

The system may also include a second local computer readable memory couplable to a second robot, a second local processor couplable to the second robot and operably couplable to the second local computer readable memory, and a second local communications interface couplable to the second robot and operably coupled to the second local processor and communicatively couplable to the application server for sharing data with the application server.

The system may also include a second local computer readable memory couplable to a second robot, a second local processor couplable to the second robot and operably couplable to the second local computer readable memory, and a second local communications interface couplable to the second robot and operably coupled to the second local processor and communicatively couplable to the local communications interface for sending data to the robot for transmission from the robot to the application server.

The local processor may execute the functionality reducing application if the local processor is unable to communicatively couple with the application server for a threshold number of consecutive attempts, or within a threshold period of time.

According to another aspect, there is provided a computer implemented method for billing a registered user of a robot. The method includes sensing a detectable change in a billable attribute of the robot, communicating the change in the billable attribute to a processor through a communications interface, and calculating a billable amount for billing a registered user, wherein the billable amount is based on the change in the billable attribute.

In some aspects, the billable attribute may comprise one or more of: a runtime of the robot, an amount of power consumed by the robot, and a distance travelled by the robot.

In some aspects, the robot may be a janitorial services robot. The billable attribute may comprise one or more of: a weight carried by the janitorial services robot, an amount of water used by the janitorial services robot, a size of an area cleaned by the janitorial services robot, an amount of cleaning solution used by the janitorial services robot, and an amount of trash collected by the janitorial services robot.

In some aspects, the robot may be a portering robot, and the billable amount is an integration of a distance traveled and a weight carried by the portering robot.

The method may also include generating a bill based on the billable amount and notifying the registered user of the bill and reducing the robot's functionality by executing a functionality reducing application if use of the robot is not in compliance with terms of use for the robot.

The method may also include displaying the billable amount on a display coupled to the robot. The method may further include accepting and processing a payment at an input terminal coupled to the robot.

The system may comprise an input device couplable to the robot, an application stored on a local computer readable memory couplable to the robot and executable by a local processor operably coupled to the local readable memory, for wirelessly transmitting data based on the billable attribute to an application server, the application server comprising the computer readable memory and the processor, upon a send command being input at the input device.

According to another aspect, there is provided a computer implemented method for reducing a robot's functionality based on a user's account information. The method includes determining if the user's account is active based on the user's account data stored on a computer readable memory, reducing the robot's functionality to a reduced state by executing a functionality reducing application at a processor operably coupled to the robot if the user's account is not active, and maintaining the robot's functionality at the reduced state until the user's account is activated.

The method may also include displaying account status information and account renewal options on a display coupled to the robot and receiving and processing a payment from the user at an input terminal to activate the user's account. The method may further include communicating with a remote server for processing the payment from the user.

According to another aspect, there is provided a computer program product for billing a registered user of a robot. The computer program product includes a non-transitory computer-readable medium having computer-readable code embodied therein executable by a processor for performing a method for billing a registered user of a robot. The method includes sensing a detectable change in a billable attribute of the robot, communicating the change in the billable attribute to a processor through a communications interface, and calculating a billable amount for billing a registered user. The billable amount is based on the change in the billable attribute.

According to another aspect, there is provided a computer program product for reducing a robot's functionality based on a user's account information. The computer program product includes a non-transitory computer-readable medium having computer-readable code embodied therein executable by a processor for reducing a robot's functionality based on a user's account information. The method includes determining if the user's account is active based on the user's account data stored on a computer readable memory, reducing the robot's functionality to a reduced state by executing a functionality reducing application at a processor operably coupled to the robot if the user's account is not active, and maintaining the robot's functionality at the reduced state until the user's account is activated.

According to another aspect, there is provided a system for billing a registered user of a robot. The system includes a robot, a sensor coupled to the robot for detecting a change in a billable attribute of the robot, a computer readable memory, a processor operably coupled to the computer readable memory and wherein the processor is communicatively couplable to the sensor through a communications interface for receiving data based on the change in the billable attribute, and an application stored on the computer readable memory and executable by the processor for calculating a billable amount to bill to a registered user, wherein the billable amount is based on the change in the billable attribute.

According to another aspect, there is a system for reducing a robot's functionality based on a user's account information, the system comprising: a computer readable memory comprising a database with a user's account information; a processor operably coupled to the computer readable memory and to a robot; a checking application stored on the computer readable memory and executable by the processor for determining if the user's account is active based on the account data; and a functionality reducing application stored on the computer readable memory executable by the processor for reducing the robot's functionality to a reduced state if the checking application determines the user's account is not active and limiting the robot's functionality to the reduced state until the checking application determines that the user's account is active.

The system may comprise a local memory couplable to the robot and a remote memory at an application server and the processor comprises a local processor couplable to the robot and operably coupled to the local memory and a remote processor at the application server operably coupled to the remote memory, wherein: the remote processor is operably coupled to a remote communications interface and the local processor is operably coupled to a local communications interface for wirelessly communicating with the remote communications interface; and the functionality reducing application is stored on the local memory and executed by the local processor.

According to another aspect, a method may reduce a robot's functionality based on a user's account information. The method may comprise: determining if a user's account is active based on the user's account information stored on a computer readable memory; reducing the robot's functionality to a reduced state by executing a functionality reducing application at a processor operably coupled to the robot if the user's account is not active; and maintaining the robot's functionality at the reduced state until the user's account is activated.

According to another aspect, a system with compliance inducements for automated usage-based billing of a robot may comprise: a robot comprising one or more sensors and a controller, wherein the robot is functional at a regular functionality state and a reduced functionality state, wherein the reduced functionality state comprises one or more reduced operational levels, relative to the regular functionality state, of one or more operational characteristics of the robot; a computer readable memory comprising a database with a user's account information and one or more terms of use, wherein each of the terms of use comprises one or more inputs and an output indicating compliance or non-compliance with the term of use; a processor operably coupled to the computer readable memory and to the robot; and a functionality setting application stored on the computer readable memory executable by the processor for evaluating the one or more terms of use and setting a functional state of the robot to be one of the regular functionality state and the reduced functionality state based at least in part based on the output of the terms of use.

The inputs of each of the terms of use may comprise one or more of: one or more outputs of the one or more sensors; and a feature of the user's account information.

The inputs of each of the terms of use may comprise a feature of the user's account information and the feature of the user's account information comprises one or more of: a payment history of the user; an amount of prepaid funds associated with the user's account; an amount of credit accumulated in the user's account; an amount of time between notification of a bill attributed to the user account for use of the robot's functionality and a time that the checking application determines if the user's account is active.

The system may comprise a compliance notification application stored on the computer readable memory and executable by the processor for providing a default notification to the user when the functionality setting application changes the functional state of the robot from the regular functionality state to the reduced functionality state and for providing a compliance notification to the user when the functionality setting application changes the functional state of the robot from the reduced functionality state to the regular functionality state.

The compliance notification application may provide the default notification and the compliance notification by displaying the default notification and the compliance notification via a user interface at the robot, in response to the user attempting to start use of the robot to perform a task.

The functionality setting application may be configured to evaluate the terms of use and set the functional state of the robot at one or more of: a regular interval of absolute time; a regular interval of operational time of the robot; a regular interval of consumption of a resource consumed during operation of the robot to perform tasks; and a regular interval of measurable tasks performed by the robot.

The functionality setting application is may be configured to evaluate the terms of use and set the functional state of the robot each time the user attempts to start use of the robot to perform a task.

Further aspects and example embodiments are illustrated in the accompanying drawings and/or described in the following description.

BRIEF DESCRIPTION OF THE DRAWINGS

In the accompanying drawings, which illustrate one or more example embodiments,

FIG. 9 shows a method for reducing a robot's usability or functionality based on a registered user's account information is shown at.

DETAILED DESCRIPTION

Figure 1:
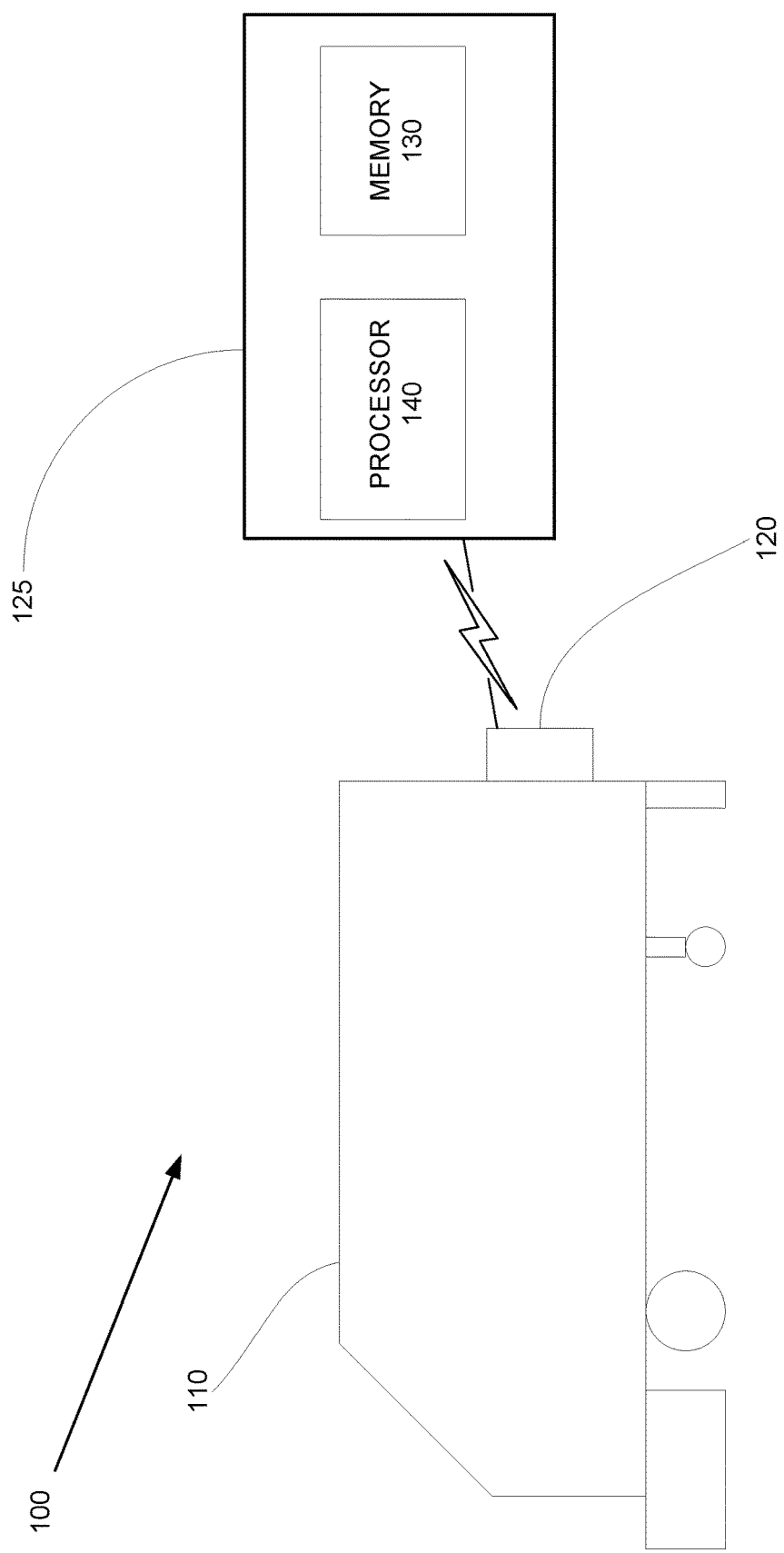
FIG. 1 is a block diagram of a system for billing based on robot usage, according to one embodiment.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Directional terms such as "top", "bottom", "upper", "lower", "left", "right", and "vertical" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", "coupling", and "couplable" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. The term "couplable", as used in the present disclosure, means that a first device is capable of being coupled to the second device. A first device that is communicatively couplable to a second device has the ability to communicatively couple with the second device but may not always be communicatively coupled.

Many robotic systems are leased or bought by the operators of the systems. This is true in the cleaning and janitorial services industry as well. Buying robotic systems and maintaining them, particularly multiple robots or fleets of robots, may be prohibitively expensive for many companies. A service model where a cleaning company or operator pays for the use of a robot may be more amenable to the needs of many companies than a model where the company buys the robot.

In addition to billing models based on rental or subscription periods, the present disclosure provides billing models based on tracking billable attributes of the robot such as, for example, actual run time, the amount of power consumed, the size of the area cleaned, or the amount of water used. These types of usage based billing models may be used for individual service robots or fleets of service robots.

Usage based billing models may be attractive to companies by providing them various billing options and the prospect of reducing usage costs over subscription based models through efficient use of their robots. Companies offering such billing models may attract more clients by providing flexible billing models. Additionally, by incentivizing the efficient use of their robots, they may lower maintenance costs over billing models that do not incentivize the efficient use of robots and increase the longevity of their robots. Companies offering usage based billing models may also gather valuable tracking data on the usage of their robots, which may allow for more targeted billing methods and improvements to the design of their robots. As an added benefit, more efficient use of cleaning robots results in more environmentally friendly cleaning.

In some embodiments, a usage based billing model or another billing model may be implemented through an automated system. Implementing an automated billing system with a robot presents many challenges. The lack of an operator for a robot makes the robot susceptible to tampering or interference. For example, sensors monitoring usage for a usage based billing model may be tampered or otherwise interfered with by a user of the robot to depress the recorded usage, and consequently reduce a usage based bill. Or a user may interfere with communications between the robot and the billing system to avoid being billed altogether.

An automated billing system may also be susceptible to abuse by a user, for example by the user not paying their bill, or failing to timely pay their bill. In some embodiments of an automated billing system, the operation of a robot may be modulated to incentivize compliance with terms of use of the robot and the billing terms of the automated billing system.

Referring to FIG. 1, an embodiment of a system 100 for tracking a billable attribute of a robot 110 and billing a registered user of the robot 110 is shown. A sensor 120 couplable to the robot 110 may be used for detecting a change in the billable attribute of the robot 110. The system includes a computer readable memory 130 for storing data based on the change in the billable amount and a processor 140 operably coupled to the computer readable memory 130 and communicatively couplable to the sensor 120 for recording the data based on the change in the billable attribute to the computer readable memory 130. An application is stored on the computer readable memory 130 for execution by the processor 140 for calculating a billable amount based on the change in the billable attribute.

The registered user may be entities other than the person responsible for the physical care of the robot. For example, the registered user may include a person or entity operating the robot, a company renting the robot, or any entity that has a contract for use of the robot. The registered user may also include an operator of the robot. A registered user may become registered by creating an account with the biller. An application may keep track of the registered user's account status for billing purposes. The registered user's account may be maintained by the application and updated to reflect billing based on the change in the billable attribute. Having the user be registered is advantageous because it reduces the possibility of a user failing to pay for the use of a robot.

A robot, for the purposes of the present disclosure, is a mobile machine that can operate autonomously without the presence of an operator. More specifically, robots within the present disclosure are mobile robots that can move and navigate in and around a job-site autonomously without the presence of an operator. For example, a robot may comprise proximity sensors for detecting objects around the robot and software for analysing the data from the proximity sensors and causing the robot to move in a path around the detected objects. The robot may also be provided with a predetermined path to travel along. The robot may have a program to allowing it to perform pre-determined actions without an operator. In some embodiments, the robot may be programmed to learn additional actions.

In some embodiments, the robot may always operate autonomously. Alternatively, the robot may have autonomous (or robot) modes and manual modes. For example, an operator may manually operate the machine when manual operation is desired. The machine may have an input device to activate an autonomous mode. Activating the autonomous mode causes the machine to operate autonomously as a robot. In certain embodiments, the autonomous mode may be activated based on certain conditions being met. For example, the machine may begin running in autonomous mode at a given time.

In the context of the present disclosure, machines described as robots are mobile. The robot may have any suitable mechanism for providing the robot with desired mobility. For example, suitable mobility mechanisms may comprise wheels, tracks, legs, wings, rotary devices, propulsion systems for flight, or any other suitable system. The mobility mechanism may be coupled to a chassis of the robot. A power source for powering the mobility mechanism may also be coupled to the chassis. In some embodiments, multiple power sources may be coupled to the robot. In addition to powering the robot's movement, the power source may also be used for powering other systems of the robot and other functions performed by the robot.

The robot may have one or more actuators for providing movement to the mobility mechanism and thereby moving the robot. Additional actuators may be used for providing movement to other systems of the robot, such as a scrubbing system for rotating scrubbing pads or grippers for gripping items. The actuators may be controlled using any suitable control system. Such a control system may comprise a processor, memory storage systems, and operating software. The robot may also include a communications interface, such as, for example, a wireless transmitter/receiver.

The robot 110 shown in FIG. 1 is a cleaning robot, specifically an autoscrubber. However, many of the systems and methods set out in the present disclosure may be used with any suitable type of robot. Some examples of the types of robots that the systems and methods described herein may be used with include, but are not limited to, entertainment robots, delivery robots, portering robots, security robots, warehouse logistics robots, rescue robots, mapping robots, transportation robots, service robots, and janitorial services robots. Janitorial services robots include cleaning robots such as autoscrubbers for scrubbing floors.

Portering robots provide porter services, such as moving an item from one location to another location. For example, a portering robot in a hospital may move surgical supplies to a surgery room.

The robots used with the systems and methods of the present disclosure perform functions that a registered user may be willing to pay for. In some cases, a biller may choose to bill the registered user based on a billable attribute of the robot. A billable attribute may be tracked using a sensor. Any suitable billable attribute may be used. In some embodiments, the billable attribute tracked by the system 100 may include, for example, the runtime of the robot. The sensor may include a clock that records the length of time that the robot is on or is operating in an autonomous operational mode. The change in the billable attribute detected by the sensor may be the length of time passed while the robot is powered on or running in an autonomous operational mode. In some embodiments, the sensor may record the length of time that the robot is performing a particular function (e.g. cleaning) autonomously. For example, in FIG. 1, the robot 110 is an autoscrubber. The sensor 120 may detect how long the autoscrubber scrubs for, the length of time that the autoscrubber scrubs autonomously and/or the like.

In some embodiments, the billable attribute may include a distance integrated with a weight of an object carried by the robot. For example, a portering robot may have a weigh scale, such as a strain gauge, coupled to an item receiving portion of the robot. The billable attribute may be the distance travelled by the robot, the weight of items carried by the robot, or a combination of weight and distance. For example, the weight multiplied by the distance may be the billable attribute. In some cases, the weight may be integrated with the distance using any suitable mathematical relation.

In some embodiments, the billable attribute may include the power consumed by the robot. The robot may consume minimal or no power when it is in an off state. In a powered state, the robot may consume power at different rates depending on what functions the robot is performing. The robot may then be billed at different rates for different functions based on power consumption.

In some cases, the robot may be powered by gasoline. In these cases, a billable attribute may include the volume of gasoline consumed by the robot. Any suitable measurement sensor and application for performing a volume calculation may be used as a volumetric sensor to measure the volume of gasoline consumed. For example, a sensor may be used to detect the level or height that the gasoline reaches within a gasoline storage reservoir coupled to the robot and an application may be executed by a processor for calculating the consumed volume using the measured height and known dimensions of the storage reservoir. Sensors such as, for example, floats, load cells, magnetic level gauges, hydrostatic devices such as displacers, bubblers, and differential-pressure transmitters, capacitance transmitters, magnetostrictive level transmitters and time-of-flight systems, such as ultrasonic or laser based systems, may be used to measure the depth of gasoline in the storage reservoir.

In certain embodiments, the volume of gasoline consumed may be calculated based on a weight of gasoline consumed. In these embodiments, a weighing scale such as, for example, a strain gauge or a spring scale, may be coupled to the storage reservoir. A processor may use data from the weighing scale at different times such as, for example, the time when the engine consuming the gasoline is turned on and when it is turned off, to calculate a change in weight of the gasoline in the storage reservoir during the time interval that the engine was running. The change in weight may be used to calculate the volume of gasoline consumed.

In certain embodiments, the time interval for calculating a change in weight of the gasoline in the storage container may be the interval between the time gasoline is added and the time just before gasoline is added again to the storage reservoir. For example, a processor may use the weight when the weight of the storage reservoir increases as the weight at the beginning of the time interval. For the weight at the end of the time interval, the processor may use the last weight detected before the weight of the storage reservoir increases a second time. Alternatively and additionally, the processor may treat the weight of the storage reservoir as a mathematical function of time and calculate the change in weight as the change between successive local maximums and minimums of the mathematical function. In some embodiments, the time interval may be between a successive closing and opening of the storage reservoir. The storage reservoir may be opened to add gasoline. A sensor at the opening may detect when a lid of the storage reservoir is opened or closed. Subtracting the weight when the lid is opened a second time from the weight when the lid was closed the first time may provide a change in the weight of the gasoline consumed. In some embodiments, the weight of the storage reservoir may itself be used as the billing attribute.

In some embodiments, the volume of gasoline consumed may be determined using a flow rate meter at an inlet or outlet of a gasoline storage reservoir and a clock for determining the time elapsed during the interval the change in volume is to be determined.

Alternatively and additionally, any suitable sensor or sensors for detecting a change in a volume of a fluid may be used as a volumetric sensor.

In certain embodiments, the robot may be a janitorial services robot, such as a cleaning robot that uses water, detergent, or other cleaning agents. The billable attribute may be, for example, the amount of water, detergent, or other cleaning agent used by the robot. The amount of water, detergent, or other cleaning agent used by the robot may be determined as a change in volume, weight, or depth within a storage reservoir of the water, detergent, or other cleaning agent. In these embodiments, sensors may detect, for example, the change in weight or mass of the cleaning agent or the volume of cleaning agent exiting the robot. In an autoscrubber robot, for example, the change in the volume of clean water carried by the autoscrubber may be used as the billable attribute. The change in volume, weight, or depth of the clean water, or any fluid used by the robot, may be determined using sensors as discussed above for the case of gasoline.

In some embodiments, the billable attribute may be the number of items dispensed by or collected by the robot. Any suitable type of counting sensor may be used to track the number of items dispensed by or collected by the robot. For example, a robot that dispenses pieces of paper may include a counter sensor that comprises a beam of light and analysis software that counts the number of times the beam of light is interrupted by the paper moving past it. In certain embodiments, a weigh scale may be used as the sensor to detect the change in weight of the total number of items as items are dispensed or collected. The weight may be correlated to a number of items based on the weight of a single item. Alternatively or additionally, the weight itself of the total number of items dispensed or collected may be used as the billable attribute.

In some embodiments, the size of the area cleaned by a janitorial services robot may be the billable attribute. In these embodiments, a sensor may detect the distance traveled by the robot while cleaning and a processor may multiply the distance traveled by the width of the path cleaned by the janitorial services robot to determine the size of the area cleaned. Alternatively, the distance travelled by the robot may be used as the billable attribute. Billing based on distance travelled may be advantageous for billing various types of robots, such as, for example, delivery robots, which may travel long distances.

In some embodiments, the weight of the robot may change while cleaning. For example, robots that dispense water or detergent during cleaning may lose weight while cleaning. In certain embodiments, the robot may gain weight. For example, a robot that vacuums may gain weight as it picks up dirt and debris. Garbage collecting robots and delivery robots may also gain weight as they collect items. In these embodiments, sensors, such as, for example, strain gauge sensors or spring balances, may be coupled to the portion of the robot that will hold the collected items. For example, trash may be held in a compartment coupled to the robot and a strain gauge may be coupled to the compartment to detect a change in weight of the compartment and the change in weight may be used as the change in the billable attribute.

In some embodiments, the sensor may track every time the robot is powered on. In these embodiments, the sensor functionality may be implemented by the processor. For example, instead of using a separately embodied sensor, the processor may detect and track the number of times the robot is powered on. The billable attribute may be the number of times the robot is turned on to perform a function and the registered user may be billed for each time the robot is turned on. In certain embodiments, the number of times the robot is powered on may correspond to the number of jobs the robot performs. For example, for a cleaning robot, the robot may power up when it is about to beginning a cleaning job. Tracking the number of times the robot turns on or is powered up may be advantageous in billing the registered user based on the number of jobs that the robot performs.

In some embodiments, the billable attribute of the robot may be communication between the robot and a registered user or a third party. A sensor, which may comprise the processor, may track the communications as the billable attribute. For example, the sensor may track the amount of data, such as, for example, bytes of data transferred between the robot and the party it is communicating with. The billable amount may then be based on the amount of data transferred. In some embodiments, the sensor may track the length of time that the robot is communicating with another party for. In some embodiments, the communications may include wireless communications between the robot and another computer. In certain embodiments, wired communications may be tracked. Alternatively, any suitable type of communications may be tracked for use in billing. For example, audio communications may be tracked. In certain embodiments, a robot may be configured to detect and respond to brainwaves of an operator. A sensor may track the amount of data detected by the robot and use that as the billable attribute.

In certain embodiments, changes in multiple attributes may be tracked by one or more sensors. Billing may be based on a combination of attributes or a registered user may select the attribute to be used for billing purposes. Alternatively, the billing company may use the tracking results to decide which attribute will be used as the billing attribute. For example, the billing company may decide, based on previous usage data, that for certain jobs or job sites, power consumption by an autoscrubber robot will be used as the billable attribute. The decision to use power consumption as the billable attribute may be made because the previous usage data showed that an above average amount of power was consumed by the robot while working at these job sites. For other job sites, usage data may show that a greater than average volume of water has been consumed in the past. The biller may then decide to use water consumption by the autoscrubber as the billable attribute. Since both power consumption and water consumption may be being tracked, the billing company may change its billing method without modifying any of the hardware on the autoscrubber robot.

Additionally or alternatively, any suitable attribute may be used as a billable attribute.

Referring again to FIG. 1, the sensor 110 may include any suitable sensor for detecting a change in a billable attribute. The sensor may, in some embodiments, be implemented by the robot's processor. For example, where the billable attribute is the number of times the robot is powered on, the robot's processor may detect and track the number of times the robot is powered on. In certain embodiments, the sensor may be separately embodied. For example, the sensor may comprise a strain gauge scale for weighing a compartment coupled to the robot. The compartment may be, for example, for holding water for cleaning or for holding trash collected by the robot.

In some embodiments, the sensor may include, for example, a clock for tracking how long a robot is running. Sensors for measuring changes in weight, power consumption, flow rates out of nozzles or exit ports, air flow, and distance travelled by a robot may be used. Audio sensors may be used for detecting audible changes, such as, for example, determining when a robot performing a cleaning operation, such as vacuuming. In certain embodiments, optical sensors for visually detecting changes in the environment caused by the robot may be used. Optical sensors may capture images of the part of the surrounding environment that the robot is working on. A processor coupled to the robot may use image analysis software for comparing successive images to detect a change in the images. In some embodiments, for example, a painting robot may be coupled to optical sensors that capture images of the surface being painted by the robot. Software executed by the robot's processor may compare an image captured when the robot begins painting the surface to an image taken after the robot ceases painting the surface. The processor may calculate, using the software, the area painted by the robot. The billable attribute in these embodiments may be the area painted by the robot. The change in billable attribute may be determined by subtracting the painted area in the final image from the painted area in the initial image.

In some embodiments, robots may be programmed to travel through a certain area performing a function, such as, for example, scrubbing. The robot may travel through the area based on maps input to the robot's memory. In some cases, the robot may be taught the layout of the area by being moved through the area. In these embodiments, a sensor may detect, using the robots internal mapping data, which areas the robot has performed its function in. The change in the billable attribute in these embodiments may be, for example, the area of the map the robot has performed or completed its function in. In certain embodiments, the robot's function may be to map an area. In these embodiments, the billable attribute may be the area mapped and the sensor may detect the size of the area mapped. In some cases, the sensor may read the map being made by the robot to estimate the size of the area mapped. For these examples, the sensor function may be performed by the robot's processor.

Combinations of sensors may be used, such as, for example, a timing sensor such as a stopwatch or clock, used in conjunction with a flowmeter that detects that water is flowing through a nozzle. The combination may provide the length of time that water is flowing as the change in billable attribute. A similar timing sensor together with a flow rate meter may be able to estimate a volume of water that is consumed by the cleaning robot as a billable attribute. Any suitable combination of sensors may be used.

Applications may be used to control the operation of a sensor and to prepare an output based on the raw output of each sensor. For example, in some embodiments, an application may be used to turn a flowmeter on and off and to monitor and control the flowmeter while it is in operation. An application may also be used to calculate, and convert to suitable units, the volume of fluid passing through the flow meter. As another example, in certain embodiments, an application may use the data provided by multiple sensors, such as a clock and a flowmeter, to calculate a change in a billable attribute, such as the amount of time water was flowing. Additionally or alternatively, any suitable application for converting data provided by sensors into data representing a change in a billable attribute may be used.

The term application, as used in this document, refers to a set of instructions executable by a computer processor. The application may be a standalone application or it may be integrated within other applications and systems, such as a computer operating system. A computer, in the context of this document, refers to a device having a processor and a computer readable memory. The memory may be the processor's internal memory. The memory may comprise a separately embodied memory to which the processor has access—e.g. by suitable physical interface, suitable network interface and/or the like.

In some embodiments, applications used for controlling a sensor and converting sensor data may be executed by a processor or processors local to the sensor and may be stored on a computer readable memory device local to the sensor. For example, the sensor may be provided as a package that includes a memory device and processor integrated with the sensor. The application software may be pre-installed on the memory device or may be installable on the memory device. For example, the application software may be downloaded and installed. In certain embodiments, the sensor may be operably coupled to a computer readable memory and processor that are external to the sensor. For example, a computing device comprising a computer readable memory device and a processor may come as a package. This device may be then be physically coupled to the robot and operably coupled to a sensor that is also physically coupled to robot. In some embodiments, the sensor may be controlled by a processor used for controlling the robot that the sensor is coupled to. Applications used for controlling the sensor may be stored on computer readable memory devices coupled to and used by the robot's processors. In some embodiments, the sensor may be controlled by the same processor and use the same computer readable memory that are used for calculating a billable amount. Alternatively, any suitable processor and computer readable memory may be operably coupled to the sensor for controlling the sensor and storing data related to the sensor. For example, a computer, comprising a processor and a computer readable memory, may control the sensor from a location remote from both the robot and the application server. The computer in this example may communicate wirelessly with the sensor.

In some embodiments, the sensor itself may be integrated with the robot. For example, the sensor functionality may be performed by a processor coupled to the robot. Additionally, in some embodiments, a sensor may be separately embodied from the robot's processor but may be physically integrated within the robot's body. In certain embodiments, the sensor may be an external unit that may be couplable to the robot. As such, a sensor may be obtained separately from the robot and later attached, coupled or otherwise retrofit to the robot. For example, the sensor, along with software and hardware for running and controlling the sensor, may be retrofit to the robot as an aftermarket modification or accessory. In certain embodiments, the sensor and the software and hardware for running it, which might include a processor, memory device, and software for operating the sensor and tracking a billable attribute of the robot, may be obtained or purchased separately from the robot. The robot may then be retrofitted with the package.

Referring again to the embodiment of the system shown in FIG. 1, an application server 125 located remotely (for the present disclosure, located remotely means not having a wired connection for communications purposes) relative to the robot 110 may be used as part of the system for tracking a billable attribute of the robot 110. The application server 125 may comprise a computer and the computer may comprise one or more processors 140 or microprocessors, such as a central processing unit (CPU). The processor 140 performs arithmetic calculations and control functions to execute software stored in a computer readable memory 130. The computer readable memory 130 may be an internal memory, such as one or both of random access memory (RAM) and read only memory (ROM), and possibly additional memory. The additional memory may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory may be physically internal to the computer, or external as shown or both. The processor 140 may retrieve items, such as applications and data lists, stored on the additional memory and move them to the internal memory, such as RAM, so that they may be executed or to perform operations on them.

The application server 125 may also comprise other similar interfaces for allowing computer programs or other instructions to be loaded. Such interfaces can comprise, for example, a communications interface or transmitter that allows software and data to be transferred between the application server 125 and external systems and networks, such as the robot 110. Examples of the communications interface comprise a modem, a network interface such as an Ethernet card, a wireless communication interface, or a serial or parallel communications port. Software and data transferred via the communications interface are in the form of signals which may be electronic, acoustic, electromagnetic, optical, or other signals capable of being received by the communications interface. Multiple interfaces, of course, may be provided on the application server 125.

In some embodiments, the application server may also comprise a display, a keyboard, pointing devices such as a mouse, and a graphical processing unit (GPU). The various components of the application server are coupled to one another either directly or indirectly by shared coupling to one or more suitable buses.

In certain embodiments, there may be processors and computer readable memories coupled to the robot for processing data based on a change in a billable attribute. These processors may be communicatively coupled to the application server and may send the processed data to the application server. In some embodiments, a billable amount may be determined by a processor coupled to the robot and then sent to the application server. Processing and storing data locally may be useful where the wireless connection between the robot and the application server is intermittent. In some situations, there may be no wireless connection or a weak connection between the robot and the application server for some period of time due to, for example, physical barriers, power outages, or network problems. In certain situations, the registered user may not want a constant wireless connection due to, for example, a desire to conserve battery power. Data related to the changes in a billable attribute, either raw data from the sensor or processed data, may be stored locally and relayed to the application server when a wireless connection is established. In some cases, the data may be sent automatically at set intervals. The communications ports at the application server and the robot may be programmed to connect intermittently. Additionally or alternatively, the communications ports may be programmed to remain connected but the data may be sent intermittently. In some embodiments, data from the sensor may be sent in real time to the application server.

In certain embodiments, a registered user may manually cause the robot to wirelessly connect with the application server and upload data related to the billable attribute. For example, referring to FIG. 2 an input device 205 couplable to the robot 210 is shown attached to the robot. The input device 205, which may include, for example, a keyboard, a keypad, a touchscreen, a microphone, a camera or optical detector, a button, a flip switch, a pointing device or any other suitable input device, may be integrated with the robot 210. Alternatively, the input device 205 may be a separate device from the robot 210 and may be attached or added to the robot 210. This may be the case where the robot is retrofitted or converted to allow automatic billing based on usage.

Figure 2:
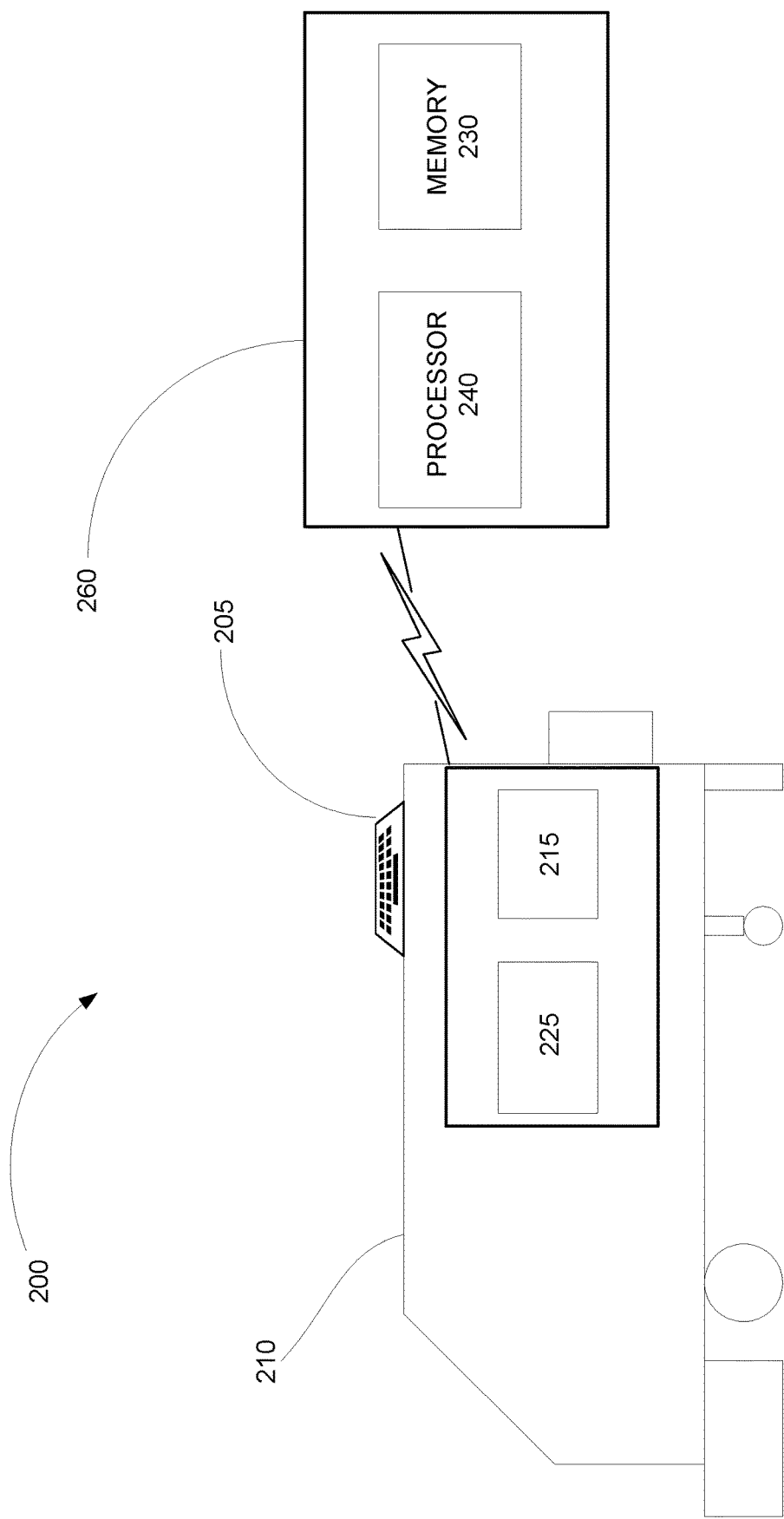
FIG. 2 is a block diagram of a system for billing based on robot usage with an input advice coupled to the robot.

In the embodiment of the system shown in FIG. 2, a local computer readable memory 215 couplable to the robot 210 has stored on it an application that is executable by a local processor 225 operably coupled to the local readable memory 215, for wirelessly transmitting data based on the billable attribute to an application server 260. The application server 260 includes a computer with a computer readable memory 230 and a processor 240 for further processing the data received from the robot 210. The data is wirelessly transmitted when a registered user inputs a send command at the input device 205. Inputting a send command may involve, for example, depending on the input device, entering a command on a keypad or keyboard, selecting or typing a command on a touch screen or other pointing device, making an audio or verbal command, making a gesture, pressing a button, flipping a switch, making a facial gesture, making a movement of the eyes, or thinking a command.

Having a registered user control when data related to changes in a billable attribute are uploaded or transmitted to the application server may be advantageous in various situations. For example, if the robot is operating in a facility that limits wireless connectivity, such as in an underground location, the registered user or an operator working for the registered user may command the robot to connect when the robot is in a location with a signal. This might be, for example, at the end of a shift or workday. In some embodiments, there may be a relay point where the robot may wirelessly connect to a local transmitter which may have a wired connection to a transmitter in a location receptive of wireless signals.

In some embodiments, data related to changes in a billable attribute may be stored on a removable computer readable memory at the robot. The removable memory may be removed by an operator periodically and uploaded at a station communicatively coupled to an application server. The robot may be configured such that it is unable to function fully if the data is not removed periodically. Alternatively, in some embodiments, the data may be directly uploaded from a memory device at the robot to a portable memory device. For example, an operator may plug a portable memory device into a port at the robot to upload the data. In certain embodiments, the data may be scanned to or wirelessly communicated to a portable memory device using, for example, near field communication systems.

Additionally or alternatively, any suitable method of uploading data to a portable memory device may be used. Once the data is uploaded to a portable memory device, the operator may then upload the data at a terminal or station that is communicatively couplable to an application server.

In certain embodiments, a billable amount may be calculated at a local processor coupled to the robot. A bill may also be generated locally at the robot and sent to a registered user from the robot. This may be advantageous for the biller by saving costs associated with an application server. The robot may be self-sufficient in billing the registered user for usage. In some embodiments, the robot may have coupled to it an input terminal and a display for allowing a user to register at the robot by, for example, setting up an account at the robot. The user, having become a registered user, may then begin using the robot. The registered user may be subsequently billed. In some embodiments input devices and systems for accepting and processing payment may also be coupled to the robot. Providing a robot available for rent for a user that does not have a pre-existing account or contract may be advantageous by making a robot available for use whenever a user needs it. The robot may be placed in a convenient location and a user may approach the robot, register at the robot, and rent the robot. The user, now registered, would not need to set up an account in advance, allowing the user to hire a robot at the user's convenience. This may be advantageous in the case of, for example, transport robots, delivery robots, and entertainment robots, amongst others, as many consumers may simply desire the services of the robot for a short period of time. Some users may hire a robot upon seeing the robot without having a previous plan to hire the robot. Allowing for users to self register and hire robots on a whim may be a beneficial business model for businesses providing robot services.

Referring once again to FIG. 2, the application for determining a billable amount based on the change in the billable attribute may be stored, in some embodiments, on a computer readable memory 230 at the application server 260. In certain embodiments, the application may be stored on a computer readable memory coupled to the robot 210. Alternatively, the application may be stored at a computer capable of connecting to both the application server and the robot. For example, the robot may communicate with a computer located in the facility the robot is operating in. Data from the robot may be sent to this computer. The application may use the data received from the robot to calculate the billable amount. The billable amount may then be communicated to the application server.

The application for calculating a billable amount may be any suitable application for determining a billable amount based on a change in a billable attribute. In some embodiments, the application may determine a billable amount based on raw data received from a sensor. In certain embodiments, the application may determine a billable amount based on data produced from data received from a sensor. For example, the sensor may send data to a processor coupled to the robot. This processor may process the received data to produce a second set of data that is based on the data received from the sensor. The application may then determine a billable amount based on this second set of data. In some embodiments, the data used by the application to determine a billable amount may have resulted from multiple processing stages.

The application may determine a billable amount using data received from multiple sources. For example, in some embodiments, multiple billable attributes may be tracked on a single robot and the billable amount may be based on a combination of changes in these billable attributes. In certain embodiments, multiple robots may provide data and the application may determine a single billable amount based on data from multiple robots.

The billable amount may be calculated after a certain amount of data from the sensor has been received or after a set amount of time. For example, the application may calculate a billable amount after the robot ceases the billable activity. This may occur at the end of a work day, for example. In certain embodiments, the billable amount may be calculated at the end of a billing period, such as, for example, at the end of a month. In some embodiments, the billable amount may be updated as further data based on the change in the billable attribute is received. The updates may occur after regular intervals. For example, the billable amount may be updated hourly or daily. Alternatively, the billable amount may be updated after any suitable interval based on additional data. In some embodiments, the billable amount may be updated continuously or in real time as the sensor provides new data based on the billable attribute.

In some embodiments, there may be a bill generating application stored on a computer readable memory for execution by a processor for generating a bill based on the billable amount. In certain embodiments, there may also be a notification application stored on a computer readable memory for execution by a processor for notifying the registered user of the bill. In some embodiments, notifying the registered user may involve automatically receiving funds from the registered user's account. For example, the registered user may have an automatic payment system setup and may not see a bill prior to payment.

In certain embodiments, the bill generating application and the notification application may be part of a single application. In some embodiments, both the bill generating application and the notification application may be part of a single application that also includes an application for determining a billable amount. Alternatively, in some embodiments, these applications may be packaged or split up into any suitable number and types of applications.

Figure 3:
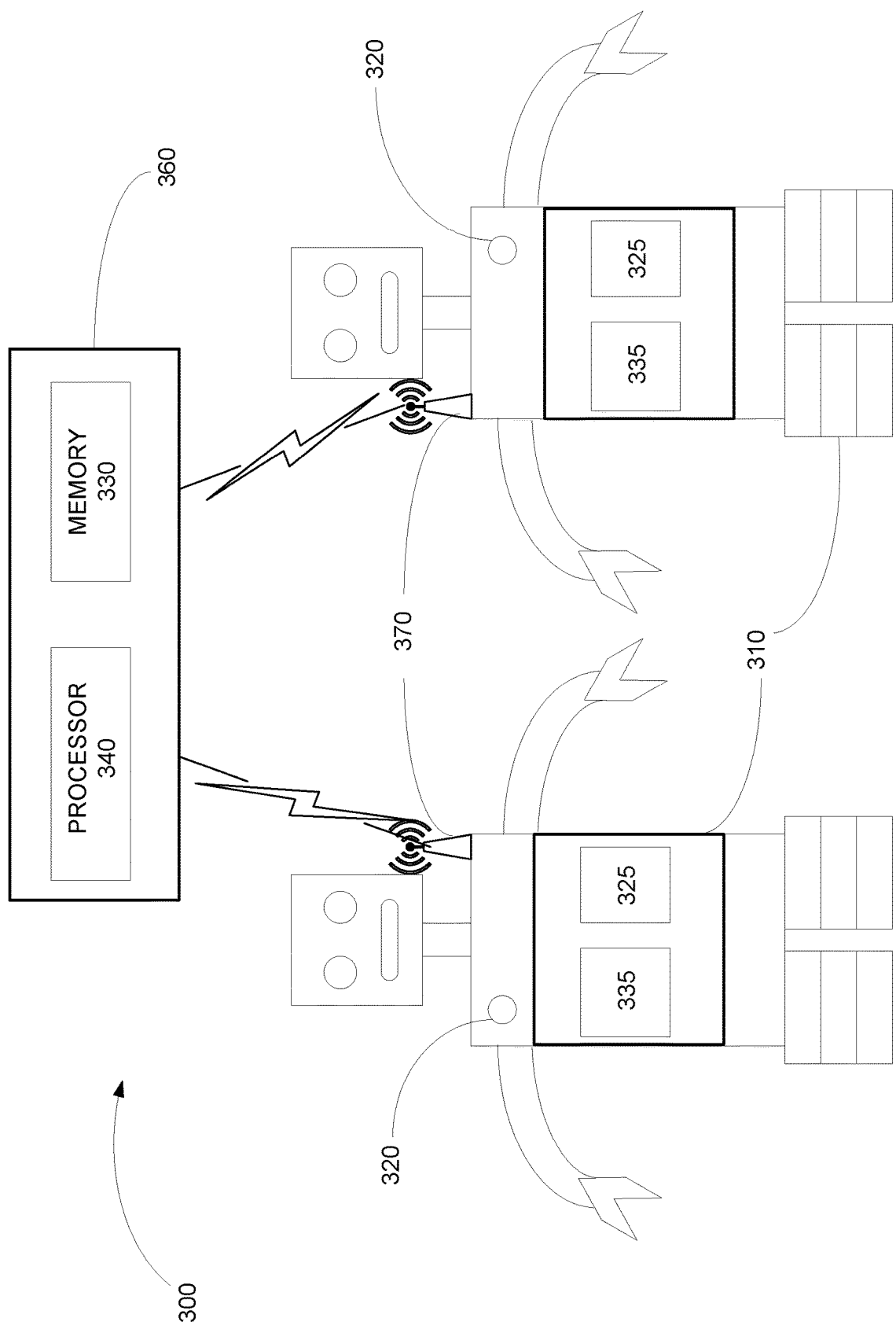
FIG. 3 is a block diagram of a system for billing based on robot usage with multiple robots in use.

Referring to FIG. 3, there is shown a system 300 for billing a registered user for the use of multiple robots 310. The sensor comprises multiple sensors 320, each couplable to a different robot 310. A billable amount is calculated based on a change in the billable attribute from at least one sensor 320. In some embodiments, the billable amount may be calculated based on a change in the billable attribute detected by each sensor 320. A communications port 370 may be coupled to each robot 310 to transmit the data produced by the sensor 320 coupled to the robot 310 to the application server 360.

In the embodiment shown in FIG. 3, the billable amount is locally determined at each robot and then communicated to an application server 360. A local computer readable memory 325 and a local processor 335 are coupled to each robot 310, with the local processor 335 being operably coupled to the local computer readable memory 325 and the sensor 320. The application for calculating a billable amount based on the change in the billable attribute may be stored on the local computer readable memory 325 for execution by the local processor 335. The billable amount from each robot 310 is wirelessly communicated to the application server 360. The billable amounts received at the application server 360 may be stored on the computer readable memory 330 and further processed by processor 340. For example, an application for tallying the billable amounts from each robot may be used to provide a total billable amount.

In some embodiments, some of the robots may be communicatively linked to each other to form a local network. In certain embodiments, each of the robots may be communicatively couplable to a local computer and the local computer may be communicatively coupled or couplable to an application server. The local computer, in certain embodiments, may be a robot itself. For example, the network may include multiple local transmitters and at least one remote transmitter. Each of the multiple local transmitters may be couplable to a respective robot for transmitting information based on the billable attribute from each respective robot to a robot coupled to a remote transmitter. The remote transmitter may be for sending the information based on the billable attribute from each of the robots to the application server. In some embodiments, the robot coupled to the remote transmitter may compile and process the information it receives from each robot into a total billable amount prior to sending it to the application server. In certain embodiments, the robot communicatively couplable to the application server may mark or identify packets of information based on the robot the information originated from prior to sending the information to the application server. The application server may then process the information from each robot and produce a total billable amount.

The information sent to the application server may be raw data from the sensors. Alternatively, the data may be processed to any suitable level, including to the level of having a billable amount calculated.

In some embodiments, the system may include safeguards and/or inducements to reduce a robot's functionality to one or more reduced state if the use of the robot is not in compliance with a set of usage terms. Reducing a robot's functionality to one of the one or more reduced states may comprise reducing the robot's functionality to a state where the robot does not have the capabilities it had before its functionality was reduced. This may comprise disabling the robot or disabling one or more of the robot's systems and functions. For example, the robot may have a system for dispensing water for cleaning. Reducing the robot's functionality may comprise disabling the water dispensing system. Reducing the robot's functionality may also comprise preventing the robot or any of the robot's systems from operating at an optimal state. For example, the robot's functionality may be reduced by limiting the robot's top speed. The robot's top speed may, for example, be halved. Reducing the robot's functionality may also comprise reducing the robot's functionality for set intervals of time or allowing the robot to function in a non-reduced state for set intervals of time. For example, the robot may be powered down after ten minutes of use, allowing the registered user ten minutes of use.

Usage terms may include, for example, time limits for paying bills, requirements for connecting to the application server, and having a functioning sensor. For example, the biller may have a policy that service will be reduced if the registered user is in arrears by a certain amount of time, such as, for example, two months. In certain embodiments, the biller may reduce service if a certain number of payments are missed. For example, missing three payments may result in reduced functionality. The biller may use any suitable terms of use.

In some embodiments, the system may include safeguards to reduce the robot's functionality if the sensor is not fully operational. A faulty sensor or a sensor that is removed or tampered with may create problems for billing the registered user. The system may have an application for determining if the sensor is not operating correctly. The application may be stored on a computer readable memory device coupled to the robot or at an application server or other remote location. In embodiments where the application is stored at a remote server, wireless communication between the remote location and the robot may allow monitoring of the robot's sensor to determine if it is operating correctly.

Similarly, the robot's functionality may be reduced if data based on a change in a billable amount is not communicated to an application server of the biller. In some embodiments, failure to communicate a change in a billable amount for a set amount of time, such as, for example, two weeks, may result in a reduction of the robot's functionality. In certain embodiments, the robot's functionality may be reduced if the robot is unable to communicatively couple with the application server for a set period of time. For example, if the robot is unable to send a signal to or receive a signal from the application server, either directly or through another communications port that the robot is linked to, for a set period of time, such as a day, the robot's functionality may be reduced until a connection is re-established. Reducing a robot's functionality may comprise disabling the robot, as discussed earlier.

The safeguards for responding to a failure to comply with terms of use may include methods or systems for reducing the robot's functionality. The biller may choose to have a system in place that gradually reduces functionality of the robot. Any suitable function of the robot may be reduced. For a cleaning robot, this might include reducing the volume of soap being dispensed, disabling a power source of the robot, stopping actuation of certain actuators, or reducing the mobility of the robot. For example, in some embodiments, after an initial missed payment, the biller may limit the time during which the robot may function. In some cases, the functionality of the robot may be reduced such that the robot rests for a period of time after being in use for a set amount of time. After additional missed payments, the biller may reduce additional functions of the robot. For example, for a cleaning robot, the biller may limit the amount of water that the robot dispenses or disable a soap or detergent dispenser in the robot. Additionally or alternatively, in some embodiments, the biller may disable the robot so that it ceases to function. For example, the registered user or an operator may be unable to turn the robot on. In some cases, the drive system of a wheeled robot may no longer function to drive the wheels.

Any suitable application or set of executable instructions for reducing the robot's functionality may be used. For example, in some embodiments, an application may be stored on a local computer readable memory coupled to the robot and executable by a local processor coupled to the robot and operably coupled to the computer readable memory. The application may be for reducing the robot's functionality by, for example, temporarily overriding the operating software of the robot during certain times if the use of the robot is not in compliance with pre-set usage terms. In some embodiments, the application may block another application responsible for controlling a function of the robot from being executed. The application, in certain embodiments, may be integrated as a part of the operating system of the robot. If certain conditions are not met, as provided in the usage terms, the controlling software of the robot, or the operating system, may begin to execute instructions for reducing the robot's functionalities, which may comprise disabling functions of the robot. In some embodiments, instructions may be included in or added to applications that control the robot's functions to to reduce the functionality of those functions.

In some embodiments, if use of the robot does not comply with the terms of use, such as, for example, using the robot with a non-functioning sensor, the registered user and/or operator may be notified. For example, in some embodiments, an output device, such as a display, may be coupled to the robot and information regarding non-compliance with usage terms may be made available at the output device. In the case of a faulty or non-functioning sensor, a report of the problem with the sensor may be made available at the output device. Any other issues with the robot or with the operation of the robot may also be communicated via the output device. In certain embodiments, the biller, or an entity associated with the biller, such as a robot maintenance company, may send a message to the registered user informing the registered user of the issue. For example, a message may be relayed to their account to display on their account website. In some embodiments, a message may be emailed to the registered user. A message may also be texted to a mobile telephone of the registered user. Alternatively, any suitable method of communicating the issue to the registered user may be used.

Figure 4:
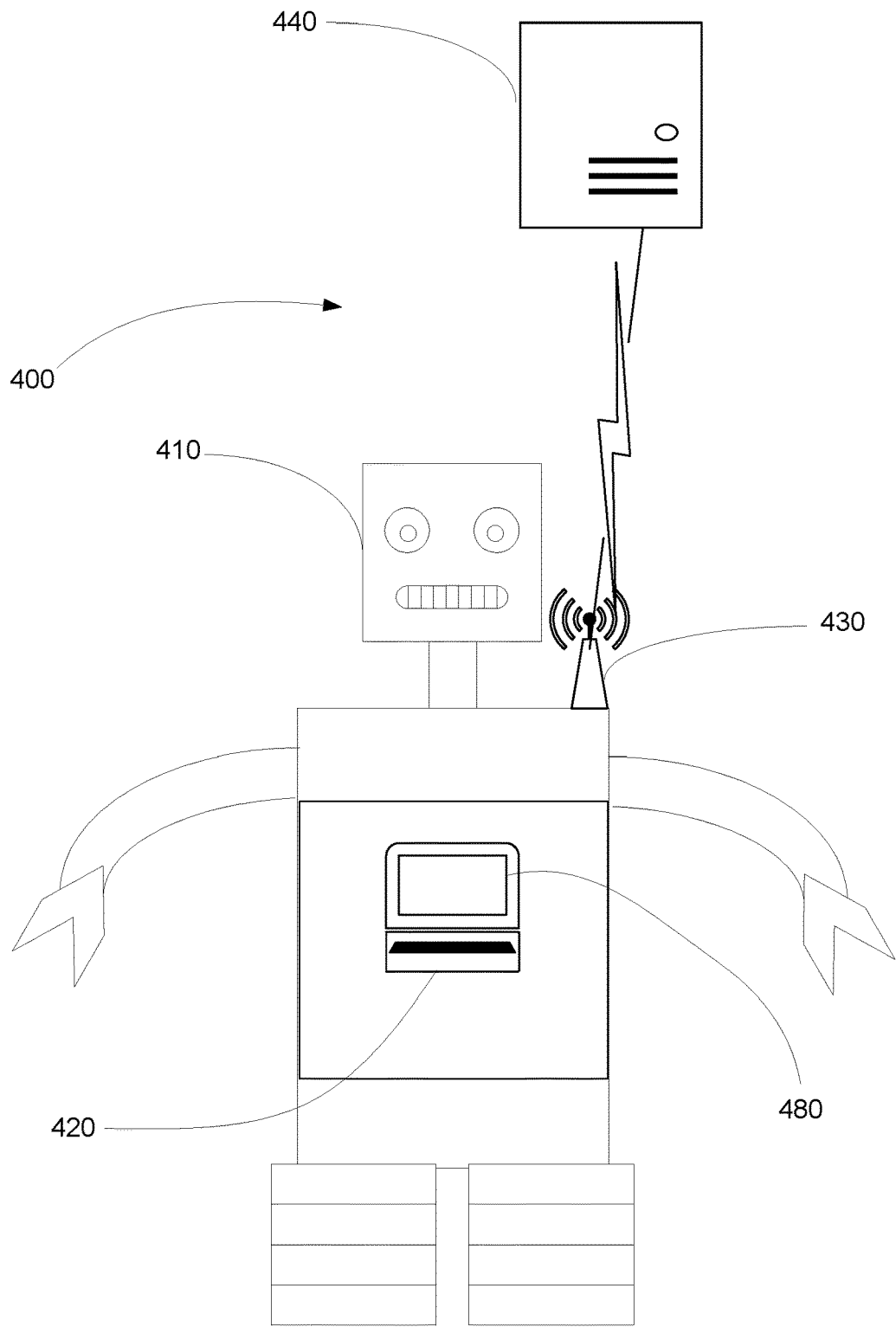
FIG. 4 is a block diagram of a system for billing based on robot usage with an on-board payment system coupled to the robot.

In cases where a payment is late or missed, the system may allow for payments at the robot. Referring to FIG. 4, an embodiment of a system 400 with an on-board payment system is shown. The robot 410 includes an input device 420 for receiving a payment from a registered user and a display 480 for displaying account information and payment options. The display 480 may be a touchscreen and form part of the input device. The payment system 400 is coupled to a communications interface 430. The communications interface 430 allows the system to communicate with a payment server 440 that has access to the registered user's account for processing payments. For example, a payment application installed on the robot 410 may wirelessly charge a web-based subscription account of the registered user. In some embodiments, accounts may have preauthorized payment systems, such as pre-authorized credit card payments.

In some embodiments, the payment system may include a notification system for electronically notifying the registered user that a payment has been received. For example, a receipt may be emailed to a registered user or a receipt may be made available through a link on the registered user's account website. In certain embodiments, the payment system may also include an output device for printing receipts. Once a payment is accepted, the robot's functionality may be restored.

The input device 420 may comprise, for example, a screen for displaying payment options, a keypad, and a card slot with a reader for receiving payment cards. Payment cards may include cards with magnetic strips, electronic chips, near-field communication circuits or any suitable system for communicating payment information. The screen may be a touchscreen and the keypad may be displayed on the touchscreen.

In some embodiments, the input device may include circuits for allowing near-field communications. Payment may then be made using payment cards equipped with suitable near-field communication devices. Hand-held devices, such as smart phones, capable of near-field communications, or any suitable device capable of near-field communications may also be used. In certain embodiments, in addition to the systems mentioned, any suitable system for recognizing an authorized registered user or payment method may be included in an input system. For example, voice input systems, fingerprint scanners, retinal scanning and recognition systems, facial recognition systems, or systems based on detecting brainwaves may be used.

In certain embodiments, the payment system may include a system for processing cash payments. This system may include slots for receiving cash payments, such as coin slots and bill slots. An output device may also be coupled to the robot for printing a receipt and dispensing change.

In some embodiments, the onboard payment system may be used to allow pre-payment for using the robot. For example, a registered user may use the payment system to pay in advance based on a desired level of change in a billable attribute. This may include, for example, pre-paying for using the robot for a set period of time, such as an hour, or pre-paying for using the robot for operating in certain size of area or for a desired distance. Selecting a desired distance may comprise selecting a desired destination location. Payment may then be made based on the distance to the desired destination location. Once the robot performs the function for reaching the desired level of change in the billable attribute, the robot may return to a state of reduced functionality.

In use, a registered user may have one or more robots set to operate or perform a billable function. They may be, for example, cleaning robots in a building such as an airport. The robots may be retrofitted with a system for tracking a billable attribute. The attribute may be, for example, the distance each robot travels while scrubbing the floor. Each robot may be equipped with sensors and software for determining the distance travelled while the robot's scrubbers are scrubbing the floor. Using this billable attribute saves the registered user from paying for the robot travelling between locations that are to be scrubbed. Once the robot begins scrubbing the floor, the system begins recording the distance travelled. In some embodiments, the raw data from the sensors is decoded and processed by an onboard processor into data representing lengths of time that the scrubbers were scrubbing. An onboard transmitter transmits this data to a receiver at an application server. Each of the other robots similarly sends data to the application server. A processor at the application server executes an application stored on a computer readable memory at the application server and calculates the total distance travelled by all of the robots. The processor calculates a billable amount based on the total distance travelled while scrubbing at the end of the work day, which may be defined in some embodiments, for example, as midnight. After a period of, for example, one month, the processor may execute a billing application to tally the billable amounts generated over the month. The application may generate a bill and post it to the registered user's online account. An email may be sent to the registered user notifying the registered user of the bill.

Figure 5:
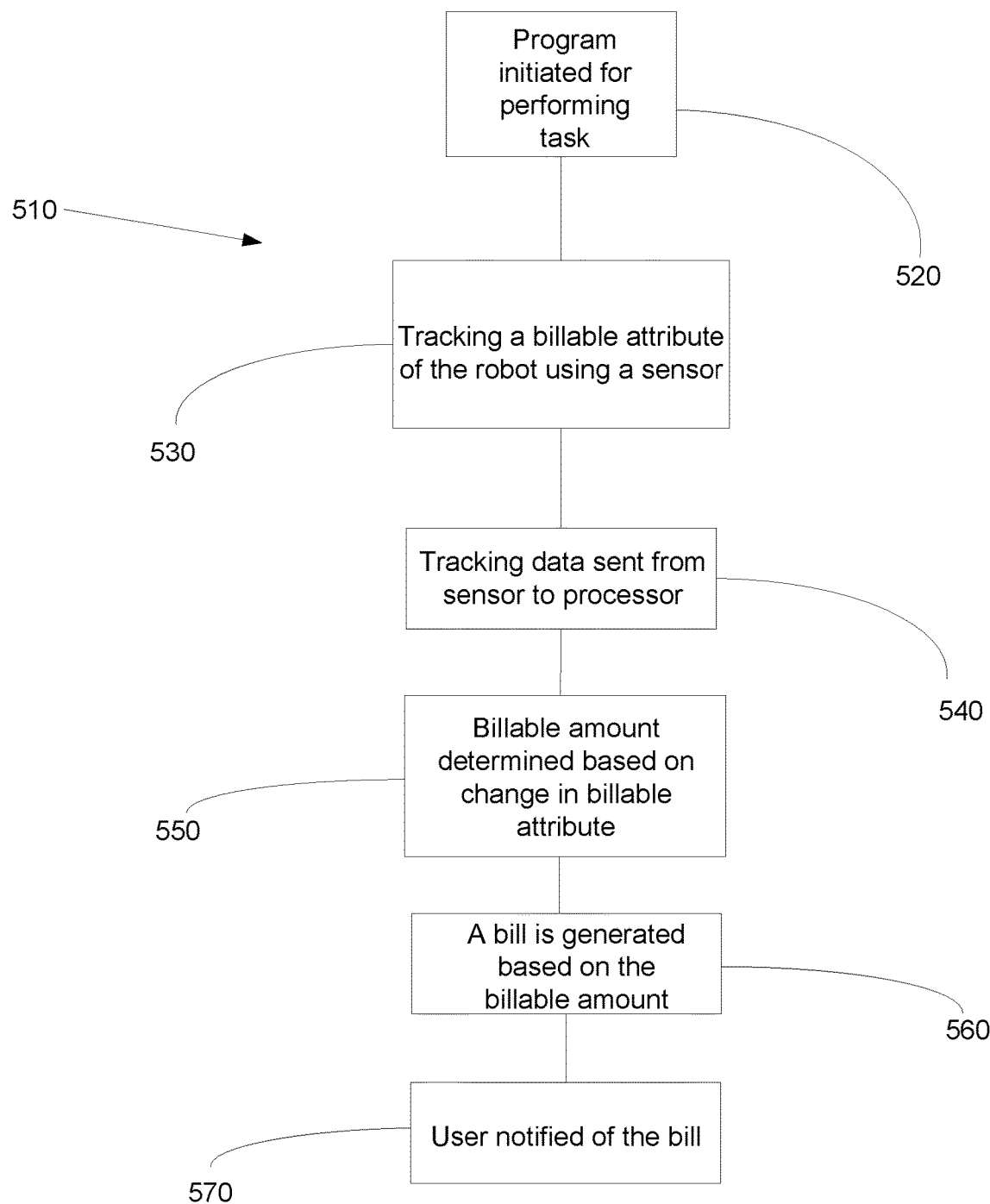
FIG. 5 shows a method for billing a registered user of a robot.

Referring to FIG. 5, an embodiment of a method for billing a registered user of a robot is shown at 510. At box 520, the robot initiates a program for performing a programmed function or task, such as, for example, scrubbing a floor. In some embodiments, the robot may be activated by an operator. In certain embodiments, an operator may issue a command to the robot to perform some function. Alternatively, the robot may automatically begin to perform some function based on its programming. At box 530, a sensor coupled to the robot begins tracking a billable attribute of the robot. In some embodiments, multiple sensors may begin tracking billable attributes of the robot. At box 540, the sensor sends the tracking data to a processor, where the block 540 tracking data is based on the billable attributes tracked by the sensors in block 530. The processor is operably coupled to a computer readable memory. The processor may be coupled to the robot. As a part of block 540, the sensor may send the tracking data through a wired connection or wirelessly. In some embodiments, the processor may be at an application server at a location remote of the robot and the data may be sent wirelessly.

At box 550, the tracking data received from the sensor in block 540 is processed to produce a billable amount based on the change in the billable attribute. The data may be processed by a processor coupled to the robot or by a processor at a server that communicates wirelessly with the robot, such as a remotely located application server. The processor may use an application stored on a computer readable memory coupled to the robot or at a remote server. The block 540 tracking data that the application uses to calculate the billable amount may be raw data from the sensor or processed data based on the data from the sensor.

At box 560, a bill is generated based on the billable amount. The bill may be generated for a set period of time. For example, the bill may be generated monthly. The billable amounts determined during the month may be used to generate a final billable amount. At box 570, a registered user is notified of the bill. The notification may be through electronic means, such as an email, text message, or by posting the bill on the registered user's account. Paper bills may also be mailed to the registered user. In some embodiments, funds to pay the bill may be automatically deducted from the registered user's account. This may occur, for example, if the registered user has an automatic payment set up.

In some embodiments, a method for billing a registered user of a robot includes sensing a detectable change in a billable attribute of the robot using a sensor coupled to the robot. The method also includes communicating the change in the billable attribute to a processor through a communications interface and calculating a billable amount based on the change in the billable attribute.

Figure 6:
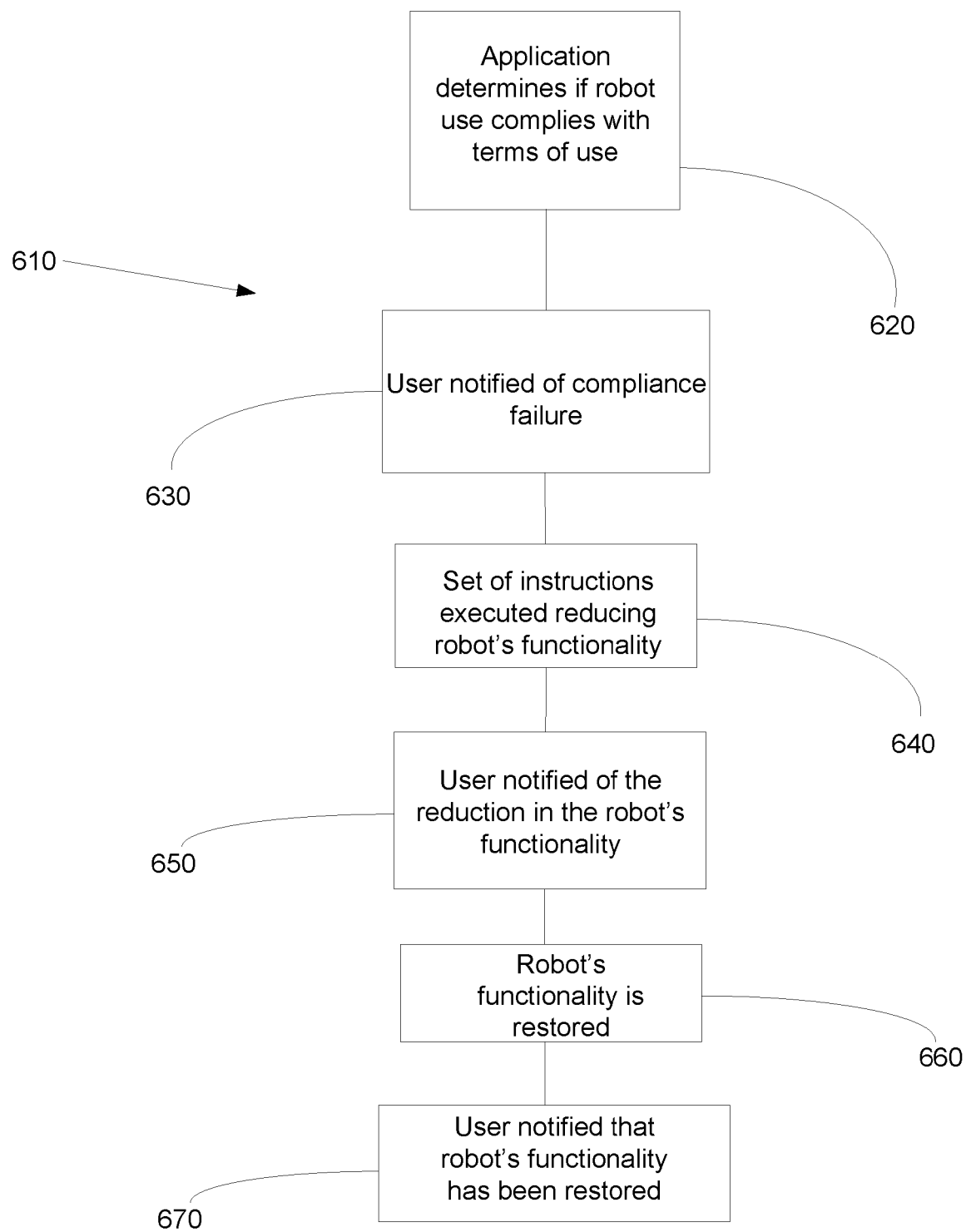
FIG. 6 shows a method for reducing the usability or functionality of a robot.

Referring to FIG. 6, a method for reducing a robot's functionality if the use of the robot is not in compliance with a set of terms of use is shown at 610. At box 620, an application determines that the robot is not being used in compliance with usage terms. The application may be executed by a processor coupled to the robot to determine if the robot is being used according to the usage terms. For example, the application may run whenever the robot begins a task. In certain embodiments, the application may be run at certain intervals to monitor the status of the robot. The application may be integrated with an operating system of the robot. In some cases, the application may launch if certain system failures are detected by the robot, such as, for example, a failure of a sensor or of a communications port.

At box 630, a message is sent to the registered user notifying the registered user of the failure in compliance. The message may be sent using any suitable medium. For example, the robot may communicate the failure in compliance wirelessly to a server and the server may send an email or text message to the registered user to notify the registered user of the failure in compliance and of possible consequences, such as a reduction in the robot's functionality or usability. In some embodiments, if the robot is unable to contact a server for some period of time and the lack of communication violates the usage terms, the server may notify the registered user of the violation. In certain embodiments, a notification may be provided at an output device coupled to the robot. For example, a notification identifying a problem with a sensor may be displayed on a display mounted on the robot to notify an operator or maintenance crew of the problem.

At box 640, a processor coupled to the robot executes a set of instructions reducing the robot's functionality. As an example, a cleaning robot may stop dispensing water for cleaning for a set amount of time. At box 650, a message is sent to the registered user notifying the registered user of the reduction in the robot's functionality. The message may include instructions for restoring the robot's functionality and warn of further consequences if use of the robot continues to violate the terms of use. The message regarding the reduced functionality may also be displayed on a display coupled to the robot. Steps 640 and 650 may be repeated multiple times.

At box 660, the processor executes a set of instructions to restore the robot's functionality. Functionality may be restored after the registered user complies with the terms of use. In some embodiments, an application may determine that the use of the robot is now in compliance with the terms of use and restore functionality. The registered user is notified of the restored functionality at box 670.

Additions and Alternatives

In addition or in the alternative to billing based on changes in billable attributes, a system may include robots that are rented out based on a subscription style system. For example, robots may be rented out on a daily, weekly, monthly, or yearly basis. Any suitable time interval may be used as a rental period. A system may be implemented to ensure that the subscription or rental account of the user renting the robots is active. The account may be active when the user has complied with the terms of use or contract for using the robot. The terms of use or contract may include payment schedules. For example, if payment for use of the robot is in arrears for longer than a set amount of time, the account status may be changed to inactive. Any suitable payment terms may be used. For example, the account may be set to inactive if the account is in arrears for three or more months.

In some embodiments, a user can purchase a subscription, for which there may be particular subscription terms associated with the user's account. The subscription can provide a base amount of a set number of billable attributes. For example, where the billable attribute is operating time or time performing a particular task, the base amount may be 1000 hours in year. The subscription terms can also stipulate a rate per unit of billable attribute that exceeds the base amount or a rate per unit of billable attribute that exceeds a set amount in a given time period (e.g. more than 10 hours of operating time per day). The robot may check the account information, and for each operation may calculate the amount of billable attribute to be subtracted from the base amount, and any other costs associated with operation beyond the base amount of billable attribute, based on the subscription terms associated with the account.

In some embodiments, a customer may activate a subscription or update the terms of service to enable robot operations. In some embodiments, the customer interfaces with a server storing the user account information and the terms of service to activate a subscription or update the terms of service. The robot is then enabled by communicating with the server. In some embodiments, the customer interfaces with the robot to activate a subscription or update the terms of service, and the robot communicated with the server to update the user account information accordingly.

In embodiments where the robot is enabled by communication with a server, the robot, or features of the robot are inactive until enabled by the server.

Figure 7:
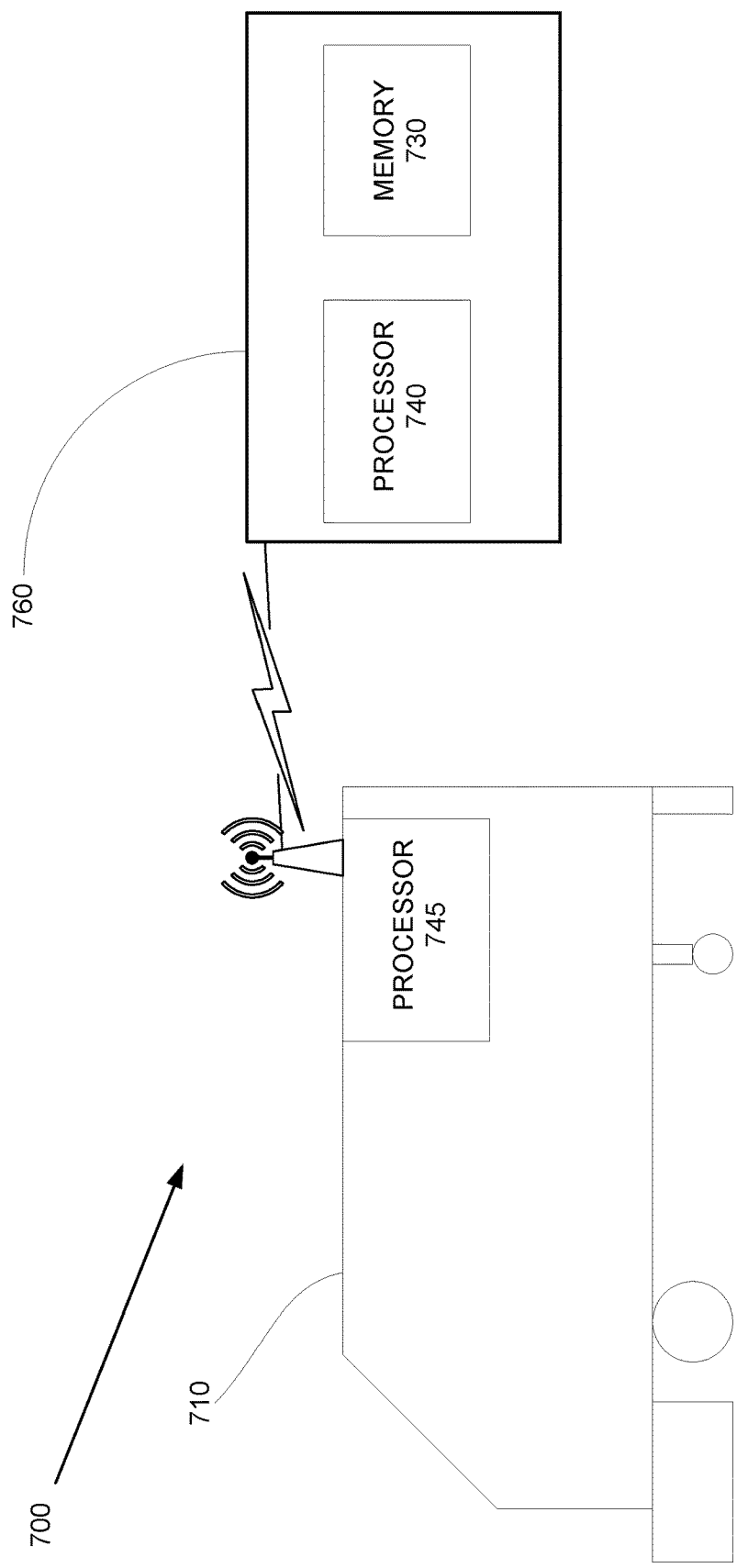
FIG. 7 is a block diagram of a system for reducing a robot's functionality based on a registered user's account information.

Referring to FIG. 7, an embodiment of a system 700 for reducing a robot's functionality based on a user's account information is shown. The system includes a computer readable memory 730 comprising a database with the user's account information and a processor 740 operably coupled to the computer readable memory 730 and to the robot 710. A checking application is stored on the computer readable memory 730. The checking application is executable by the processor 740 for determining if the user's account is active based on the account data. A functionality reducing application is also stored on the computer readable memory 730 and is executable by the processor 740 for reducing the robot's functionality to a reduced state if the checking application determines that the user's account is not active. The functionality reducing application may limit the robot's functionality to the reduced state until the checking application determines that the user's account is active.

In another embodiment, the checking application may evaluate one or more terms of use to determine if the robot and the user's account information are in compliance with the terms of use. In some embodiments, the checking application may evaluate the terms of use at one or more of: a regular interval of absolute time; a regular interval of operational time of the robot; a regular interval of consumption of a resource consumed during operation of the robot to perform tasks; and a regular interval of measurable tasks performed by the robot.

In some embodiments, inputs of each of the terms of use comprise a feature of the user's account information, and a feature of the user's account information comprises one or more of: a payment history of the user; an amount of prepaid funds associated with the user's account; an amount of credit accumulated in the user's account; an amount of time between notification of a bill attributed to the user account for use of the robot's functionality and a time that the checking application determines if the user's account is active.

Reducing the robot's functionality to a reduced state and maintaining the robot's functionality in a reduced state until the user's account is active is advantageous because it links the robot to the account rather than linking only software to the account. Reducing the robot's functionality just by reducing the functionality of software used to operate the robot may allow a user to replace the software and restore the robot's functionality. In a system where the biller or an entity associated with the biller owns the robots and is renting out the robots, it is advantageous to limit the functionality of the robot itself and not just the functionality of the software by linking the robot's functionality to the account. Reducing the robot's functionality may include disabling any or all of the robot's functions. The robot may be configured to function at more than one levels of reduced functionality.

Some embodiments comprise a compliance notification application stored on a computer readable memory and executable by a processor for providing a default notification to the user when the functionality setting application changes the functional state of the robot from a regular functionality state to a reduced functionality state. In some embodiments the compliance notification application may provide a compliance notification to the user when the functionality setting application changes the functional state of the robot from the reduced functionality state to the regular functionality state.

In some embodiments, the compliance notification application may provide the default notification and the compliance notification by displaying the default notification and the compliance notification via a user interface at the robot, in response to the user attempting to start use of the robot to perform a task.

In some embodiments, the functionality reducing application is configured to limit the robot's functionality to the reduced state until the checking application determines that the user's account is active and then, upon determining that the user's account is active, increase the robot's functionality to a prior state, the prior state having increased functionality relative to the reduced state In some embodiments, the checking application is configured to determine that the user's account is not active, by determining that payment by the user for use of the robot's functionality is in arrears according to a payment acceptability threshold.

In some embodiments, the payment acceptability threshold is based on one or more of: a payment history of the user; an amount of prepaid funds associated with the user's account; an amount of credit accumulated in the user's account; an amount of time between notification of a bill attributed to the user account for use of the robot's functionality and a time that the checking application determines if the user's account is active.

In some embodiments, a compliance notification application is stored on the computer readable memory and executable by the processor for displaying a default notification to the user, via a user interface at the robot, that the user's account has been determined to be inactive based on the user's payment for the use of the robot's functionality failing to satisfy the payment acceptability threshold, the compliance notification application configured to display the default notification to the user in response to the user attempting to start use of the robot's functionality.

In some embodiments, the computer readable memory and the processor may be coupled to the robot. In certain embodiments, such as the embodiment shown in FIG. 7, the computer readable memory 730 and the processor 740 may be located at a remote server 760 and communicate wirelessly with a processer 745 coupled to the robot 710.

Figure 8:
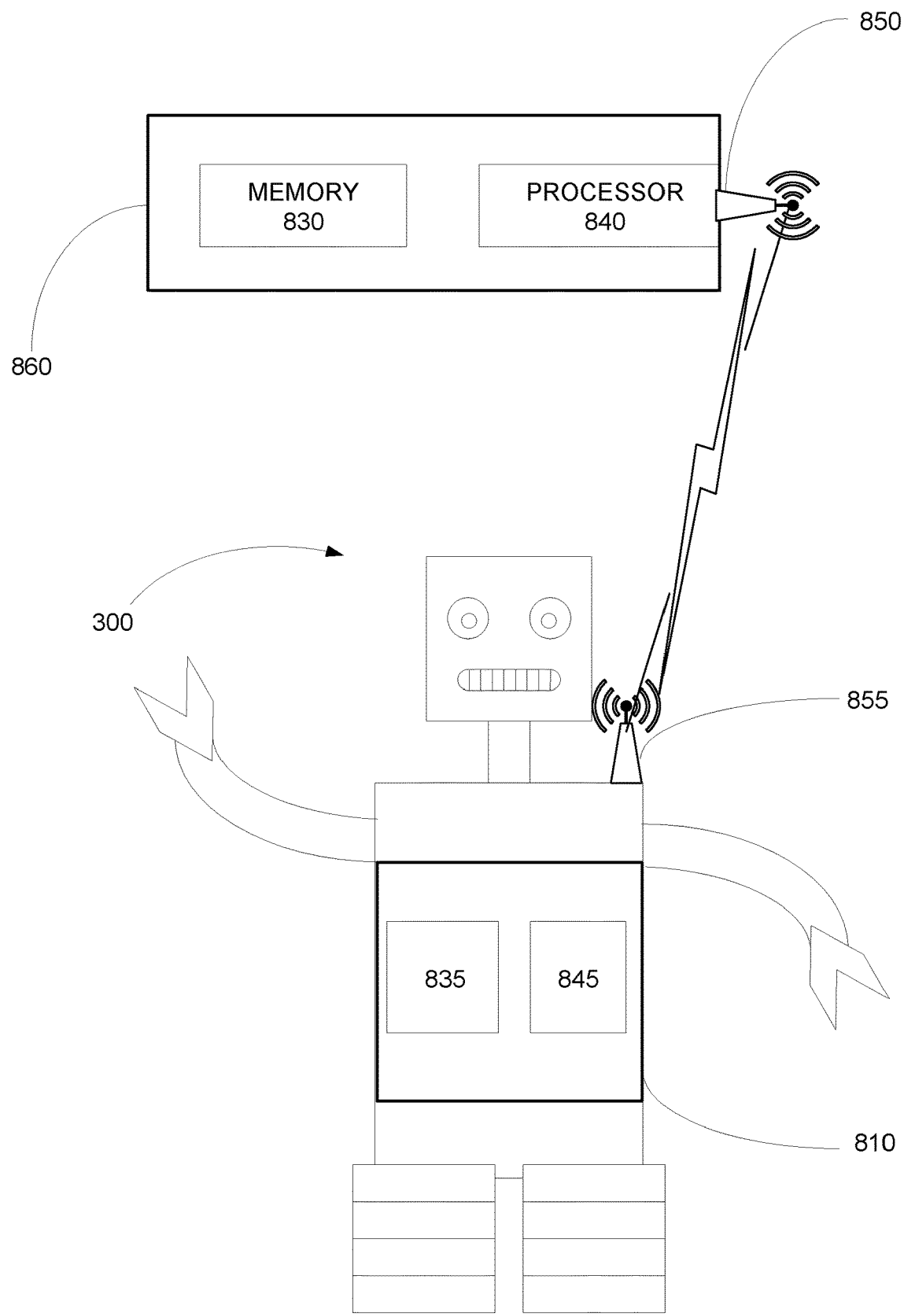
FIG. 8 is a block diagram of a system for reducing a robot's functionality according to an embodiment.

Referring to FIG. 8, in some embodiments, the computer readable memory includes multiple memories and the processor includes multiple processors. For example, the computer readable memory may include a local memory 835 coupled to the robot 810 and a remote memory 830 at an application server 860. The processor may include a local processor 845 coupled to the robot 810 and operably coupled to the local memory 835 and a remote processor 840 at the application server 860. The remote processor 840 is operably coupled to the remote memory 830. The remote processor 840 may be communicatively couplable to the local processor 845 through a communications interface 850 operably coupled to the remote processor 840 and a communications interface 855 operably coupled to the local processor 845. The functionality reducing application may be stored on the local memory 835 and executed by the local processor 845. The checking application and the account data may be stored on the remote memory 830. Copies of the checking application and the account data may also be stored on the local memory 835. The checking application may be executed by the remote processor 840.

In some embodiments, the system may include an output display coupled to the robot for displaying account status information. The display may also comprise a user interface to allow inputs by a user or an operator. Options to update the account status may be provided on the interface. For example, an operator may use the user interface to renew the account. The user may be billed and pay the bill at a later time. Alternatively, the user interface may allow the system to deduct payment from the user's account. The user may also enter banking or credit card information to make a payment. In some embodiments, the system may include an input device and suitable payment processing software to allow a user or operator to make a payment at the robot using a bank card or other payment device, as discussed previously. Making a payment using the payment device may activate the account and restore the functionality of the robot.

The information displayed at the robot may comprise information being communicated in real time by the application server. In certain embodiments, the information may additionally or alternatively be stored on a memory device at the robot. The robot may periodically wirelessly couple with the application server through a communications port to update the information to be displayed. The periods between updates might be regular intervals or irregular intervals. Any suitable updating schedule may be used.

In some embodiments, the local processor may periodically communicate with the application server to check the user's account status and execute the functionality reducing application if the local processor is unable to communicate with the application server for a threshold number of consecutive attempts. For example, the system may be configured so that if the processor at the robot is unable to contact the application server for four consecutive attempts, the robot's functionality is reduced. Any suitable number of attempts may be used as a trigger for reducing the robot's functionality. Having the local processor contact the application server regularly may be useful for reducing the risk of a user blocking communications between the robot and the application server in order to avoid paying.

In some embodiments, the system may comprise two or more robots, each communicatively coupled to the application server for receiving and transmitting executable instructions and data. In certain embodiments, the robots may form a local communications network for communicating with each other. At least one of these robots may be communicatively coupled to the application server for sharing data between the local communications network and the application server. For example, the system may include at least one robot that may be communicatively coupled or couplable to the application server. This robot may also be communicatively coupled or couplable to one or more additional robots for sending to them executable instructions and data received from the application server and for receiving data from the additional robots. The robot that is communicatively couplable to the application server may also send to the application server instructions and data received from the one or more additional robots.

Figure 9:
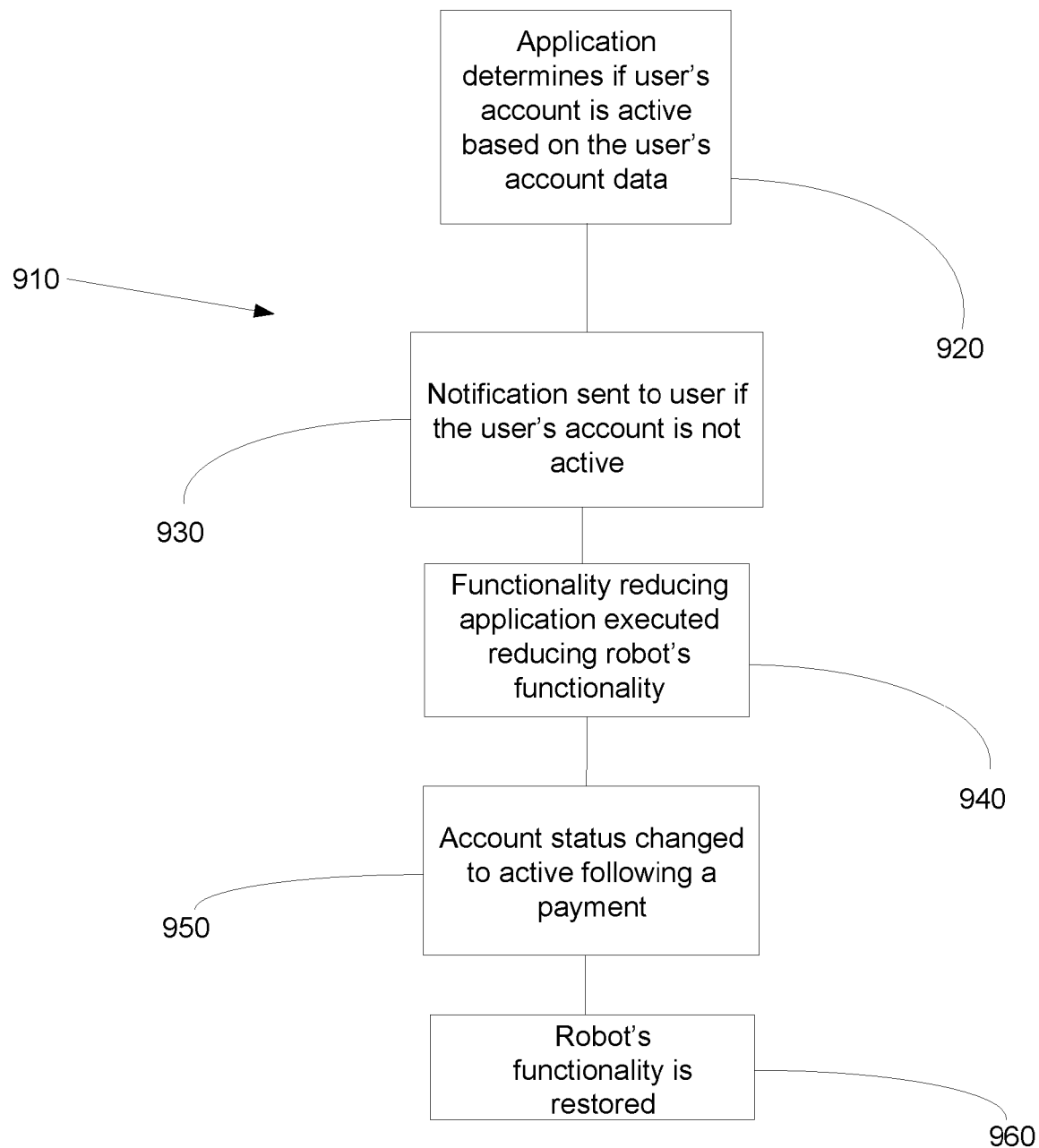

Referring to FIG. 9, a method for reducing a robot's functionality based on a user's account information is shown at 910. At box 920, an application determines if the user's account is active based on the user's account data. The account data may be stored on a computer readable memory coupled to the robot or at a remote server. At box 930, a notification is sent to the user if the user's account is not active. At box 940, the robot's functionality is reduced through the execution of a functionality reducing application. The robot's functionality will be maintained at a reduced state until the user's account is activated. At box 950, the account status is changed to active due to the user making a suitable payment. At box 960, the robot's functionality is restored.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups.

It is contemplated that any part of any aspect or embodiment discussed in this specification can be implemented or combined with any part of any other aspect or embodiment discussed in this specification.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A system for reducing a robot's functionality based on a user's account information, the system comprising:
    (a) a computer readable memory comprising a database with a user's account information;
    (b) a processor operably coupled to the computer readable memory and to a robot;
    (c) a checking application stored on the computer readable memory and executable by the processor for determining if the user's account is active based on the account data;
    (d) a functionality reducing application stored on the computer readable memory executable by the processor for reducing the robot's functionality to a reduced state if the checking application determines the user's account is not active and limiting the robot's functionality to the reduced state until the checking application determines that the user's account is active;
    (e) a sensor couplable to the robot for detecting a change in a billable attribute of the robot;
    (f) the processor communicatively couplable to the sensor for receiving data based on the change in the billable attribute; and
    (g) an application stored on the computer readable memory and executable by the processor for calculating a billable amount to bill to the user, wherein the billable amount is based on the change in the billable attribute.

2. The system of claim 1 wherein the computer readable memory comprises a local memory couplable to the robot and a remote memory at an application server and the processor comprises a local processor couplable to the robot and operably coupled to the local memory and a remote processor at the application server operably coupled to the remote memory, wherein:
    (a) the remote processor is operably coupled to a remote communications interface and the local processor is operably coupled to a local communications interface for wirelessly communicating with the remote communications interface; and
    (b) the functionality reducing application is stored on the local memory and executed by the local processor.

3. The system of claim 2, wherein the checking application and the database are stored on the remote memory and the checking application is executed by the remote processor.

4. The system of claim 3 wherein the functionality reducing application is executed by the local processor if the local processor is unable to communicatively couple with the application server for a threshold number of consecutive attempts, or within a threshold period of time.

5. The system of claim 1 wherein reducing the robot's functionality to a reduced state comprises disabling a function performed by the robot.

6. The system of claim 5 wherein disabling a function performed by the robot comprises disabling a fluid dispensing system coupled to the robot.

7. The system of claim 1 wherein reducing the robot's functionality to a reduced state comprises disabling the robot's mobility for a set interval of time.

8. The system of claim 1 wherein reducing the robot's functionality to a reduced state comprises reducing a speed of travel of the robot.

9. The system of claim 1 further comprising an input device couplable to the robot for receiving and processing a payment from the user to activate the user's account.

10. The system of claim 1 wherein the functionality reducing application is configured to limit the robot's functionality to the reduced state until the checking application determines that the user's account is active and then, upon determining that the user's account is active, increase the robot's functionality to a prior state, the prior state having increased functionality relative to the reduced state.

11. The system of claim 1, wherein the checking application is configured to determine that the user's account is not active, by determining that payment by the user for use of the robot's functionality is in arrears according to a payment acceptability threshold.

12. The system of claim 11 wherein the payment acceptability threshold is based on one or more of: a payment history of the user; an amount of prepaid funds associated with the user's account; an amount of credit accumulated in the user's account; an amount of time between notification of a bill attributed to the user account for use of the robot's functionality and a time that the checking application determines if the user's account is active.

13. The system of claim 11 comprising a compliance notification application stored on the computer readable memory and executable by the processor for displaying a default notification to the user, via a user interface at the robot, that the user's account has been determined to be inactive based on the user's payment for the use of the robot's functionality failing to satisfy the payment acceptability threshold, the compliance notification application configured to display the default notification to the user in response to the user attempting to start use of the robot's functionality.

14. The system of claim 1, wherein the robot is a janitorial services robot, and the billable attribute is one or more of: a runtime of the janitorial services robot, an amount of power consumed by the janitorial services robot, a distance travelled by the janitorial services robot, a weight carried by the janitorial services robot, a volume or weight of water used by the janitorial services robot, an area cleaned by the janitorial services robot, a volume or weight of cleaning solution used by the janitorial services robot, and a volume or weight of trash collected by the janitorial services robot.

15. The system of claim 1 further comprising a notification application stored on the computer readable memory for execution by the processor for notifying the user of the bill.

16. The system of claim 1 wherein the computer readable memory and the processor are located at an application server and communicate wirelessly through a communications interface with a processor coupled to the robot for receiving data based on changes in the billable attribute.

17. The system of claim 1 further comprising:
(a) a display coupled to the robot for displaying a bill based on the billable amount and payment options;
(b) an input terminal coupled to the robot for selecting a payment option and for receiving and processing a payment from the user.

18. The system of claim 1 further comprising:
(a) an input device couplable to the robot;
(b) an application stored on a local computer readable memory couplable to the robot and executable by a local processor operably coupled to the local readable memory, for wirelessly transmitting data based on the billable attribute to an application server, the application server comprising the computer readable memory and the processor, upon a send command being input at the input device.

19. A method for reducing a robot's functionality based on a user's account information, the method comprising:
(a) determining if a user's account is active based on the user's account information stored on a computer readable memory;
(b) reducing the robot's functionality to a reduced state by executing a functionality reducing application at a processor operably coupled to the robot if the user's account is not active; and
(c) maintaining the robot's functionality at the reduced state until the user's account is activated;
(d) detecting a change in a billable attribute of the robot by a sensor couplable to the robot;
(e) receiving, at the processor, data based on the change in the billable attribute; and
(f) calculating, by an application stored on the computer readable memory and executable by the processor, a billable amount to bill to the user, wherein the billable amount is based on the change in the billable attribute.

20. The method of claim 19 further comprising receiving and processing a payment from the user at an input terminal coupled to the robot to activate the user's account.

21. The method of claim 20 further comprising communicating with a remote server for processing the payment from the user.

22. A non-transitory computer-readable medium comprising computer executable code that, when executed by a computer system, causes the computer system to perform the method of claim 19.

23. A system with compliance inducements for automated usage-based billing of a robot, the system comprising:
(a) a robot comprising one or more sensors and a controller, wherein the robot is functional at a regular functionality state and a reduced functionality state, wherein the reduced functionality state comprises one or more reduced operational levels, relative to the regular functionality state, of one or more operational characteristics of the robot;
(b) a computer readable memory comprising a database with a user's account information and one or more terms of use, wherein each of the terms of use comprises one or more inputs and an output indicating compliance or non-compliance with the term of use;
(c) a processor operably coupled to the computer readable memory and to the robot;
(d) a functionality setting application stored on the computer readable memory executable by the processor for evaluating the one or more terms of use and setting a functional state of the robot to be one of the regular functionality state and the reduced functionality state based at least in part based on the output of the terms of use;
(e) a sensor couplable to the robot for detecting a change in a billable attribute of the robot;
(f) the processor communicatively couplable to the sensor for receiving data based on the change in the billable attribute; and
(g) an application stored on the computer readable memory and executable by the processor for calculating a billable amount to bill to the user, wherein the billable amount is based on the change in the billable attribute.

24. A system according to claim 23, wherein the inputs of each of the terms of use comprise one or more of: one or more outputs of the one or more sensors; and a feature of the user's account information.

25. A system according to claim 24 wherein the inputs of each of the terms of use comprise the feature of the user's account information and the feature of the user's account information comprises one or more of: a payment history of the user; an amount of prepaid funds associated with the user's account; an amount of credit accumulated in the user's account; an amount of time between notification of a bill attributed to the user account for use of the robot's functionality and a time that the checking application determines if the user's account is active.

26. A system according to claim 23 comprising a compliance notification application stored on the computer readable memory and executable by the processor for providing a default notification to the user when the functionality setting application changes the functional state of the robot from the regular functionality state to the reduced functionality state and for providing a compliance notification to the user when the functionality setting application changes the functional state of the robot from the reduced functionality state to the regular functionality state.

27. A system according to claim 26 wherein the compliance notification application provides the default notification and the compliance notification by displaying the default notification and the compliance notification via a user interface at the robot, in response to the user attempting to start use of the robot to perform a task.

28. A system according to claim 23 wherein the functionality setting application is configured to evaluate the terms of use and set the functional state of the robot at one or more of: a regular interval of absolute time; a regular interval of operational time of the robot; a regular interval of consumption of a resource consumed during operation of the robot to perform tasks; and a regular interval of measurable tasks performed by the robot.

29. A system according to claim 23 wherein the functionality setting application is configured to evaluate the terms of use and set the functional state of the robot each time the user attempts to start use of the robot to perform a task.

30. A system according to claim 23 wherein the computer readable memory comprises a local memory at the robot and a remote memory at an application server and the processor comprises a local processor at the robot and operably coupled to the local memory and a remote processor at the application server operably coupled to the remote memory, wherein:
   (a) the remote processor is operably coupled to a remote communications interface and the local processor is operably coupled to a local communications interface for wirelessly communicating with the remote communications interface; and
   (b) the functionality reducing application is stored on the local memory and executed by the local processor.

31. The system of claim 30, wherein the checking application and the database are stored on the remote memory and the checking application is executed by the remote processor.

\* \* \* \* \*